(12) United States Patent  
Zhang et al.

(10) Patent No.: US 12,216,849 B2  
(45) Date of Patent: Feb. 4, 2025

(54) DISPLAY PANEL AND DISPLAY APPARATUS HAVING CRACK DETECTION CIRCUIT WITH CONDUCTIVE LOOP

(71) Applicants: Chengdu BOE Optoelectronics Technology Co., Ltd., Sichuan (CN); BOE Technology Group Co., Ltd., Beijing (CN)

(72) Inventors: Bo Zhang, Beijing (CN); Hongwei Ma, Beijing (CN); Yulong Wei, Beijing (CN); Yi Qu, Beijing (CN); Zhiwen Chu, Beijing (CN); Xinxin Wang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/905,815

(22) PCT Filed: Dec. 23, 2021

(86) PCT No.: PCT/CN2021/140751  
§ 371 (c)(1),  
(2) Date: Jun. 29, 2023

(87) PCT Pub. No.: WO2023/115443  
PCT Pub. Date: Jun. 29, 2023

(65) Prior Publication Data  
US 2024/0211061 A1 Jun. 27, 2024

(51) Int. Cl.  
*G06F 3/041* (2006.01)  
*G06F 3/044* (2006.01)  
*G09G 3/3208* (2016.01)

(52) U.S. Cl.  
CPC ........ *G06F 3/0412* (2013.01); *G06F 3/04164* (2019.05); *G06F 3/0445* (2019.05);  
(Continued)

(58) Field of Classification Search  
CPC .. G06F 3/0412; G06F 3/0445; G06F 3/04164; G06F 2203/04104; G09G 3/3208  
See application file for complete search history.

(56) References Cited

U.S. PATENT DOCUMENTS

| 10,964,612 B2 | 3/2021 | Lee et al. |
| 2016/0351093 A1 | 12/2016 | Kim et al. |

(Continued)

FOREIGN PATENT DOCUMENTS

| CN | 105679215 A | 6/2016 |
| CN | 106206654 A | 12/2016 |

(Continued)

OTHER PUBLICATIONS

International Search Report & Written Opinion mailed Aug. 30, 2022, regarding PCT/CN2021/140751.

(Continued)

*Primary Examiner* — Lisa S Landis  
(74) *Attorney, Agent, or Firm* — Intellectual Valley Law, P.C.

(57) ABSTRACT

A display panel is provided. The display panel comprises: a touch electrode layer at least partially in a display area of the display panel; a gate-on-array in a peripheral area of the display panel; and a crack detection circuit; wherein at least a portion of signal lines in the crack detection circuit comprises a metal line in a same layer as mesh lines of the touch electrode layer.

18 Claims, 20 Drawing Sheets

(52) U.S. Cl.
CPC . *G09G 3/3208* (2013.01); *G06F 2203/04104* (2013.01); *G06F 2203/04112* (2013.01); *G09G 2300/0408* (2013.01); *G09G 2330/12* (2013.01); *G09G 2354/00* (2013.01)

(56) References Cited

U.S. PATENT DOCUMENTS

| | | | |
|---|---|---|---|
| 2017/0270842 | A1 | 9/2017 | Nam et al. |
| 2018/0158894 | A1* | 6/2018 | Park .................. H10K 50/8445 |
| 2018/0166525 | A1 | 6/2018 | Kim et al. |
| 2020/0363895 | A1 | 11/2020 | Shim et al. |
| 2020/0379595 | A1 | 12/2020 | Kim |
| 2023/0027375 | A1 | 1/2023 | Zhang et al. |

FOREIGN PATENT DOCUMENTS

| | | |
|---|---|---|
| CN | 107195249 A | 9/2017 |
| CN | 108172593 A | 6/2018 |
| CN | 109142447 A | 1/2019 |
| CN | 109192072 A | 1/2019 |
| CN | 110097841 A | 8/2019 |
| CN | 110993659 A | 4/2020 |
| CN | 111256957 A | 6/2020 |
| CN | 111307867 A | 6/2020 |
| CN | 111564130 A | 8/2020 |
| CN | 112018155 A | 12/2020 |
| CN | 112164711 A | 1/2021 |
| CN | 112419949 A | 2/2021 |
| CN | 112736064 A | 4/2021 |
| CN | 113466252 A | 10/2021 |

OTHER PUBLICATIONS

Su et al. "LCD crack automatic detection method based on machine vision research", PC Application, vol. 35, Issue 10, 2016; English translation of Abstract attached.

* cited by examiner

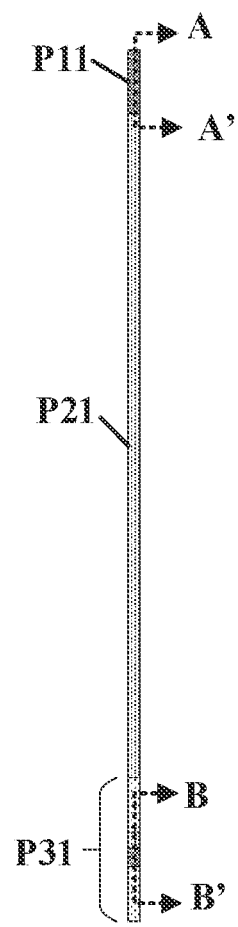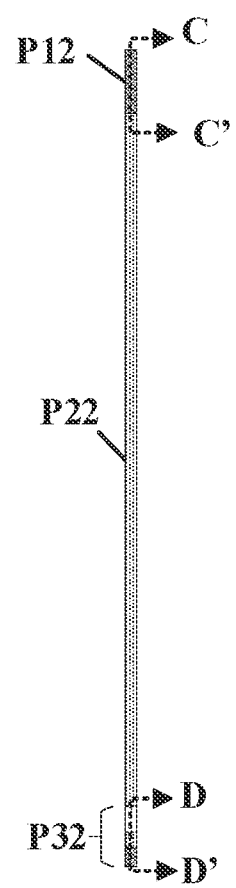
FIG. 10A
FIG. 10B

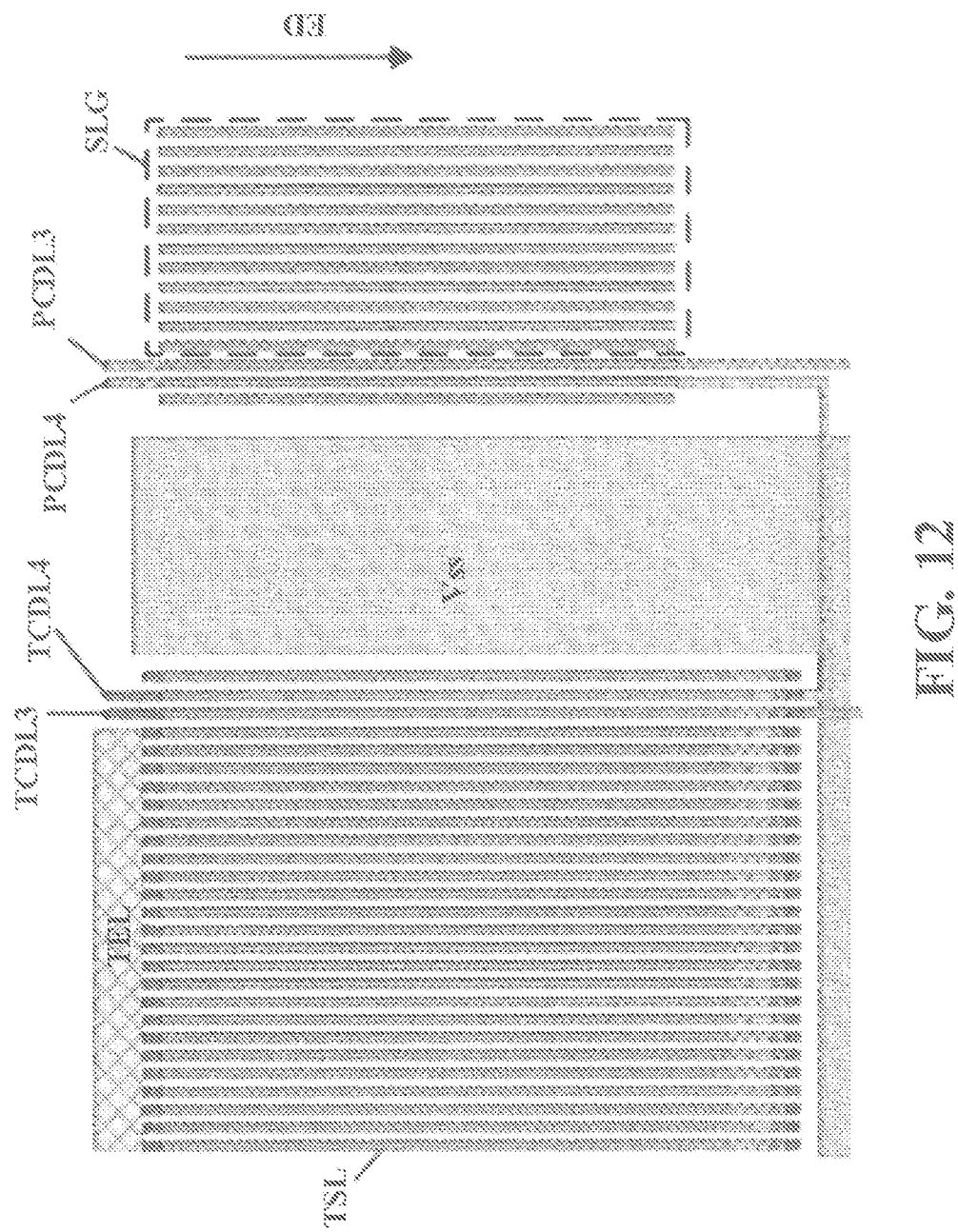

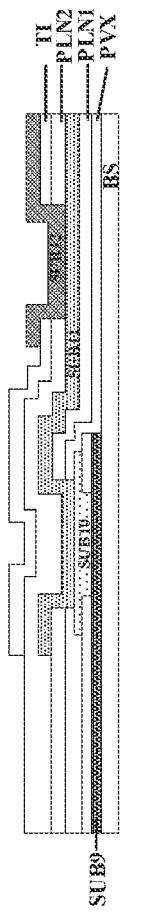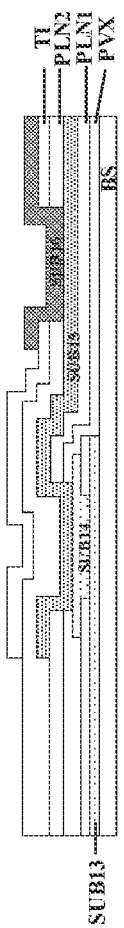
FIG. 15B
FIG. 15D
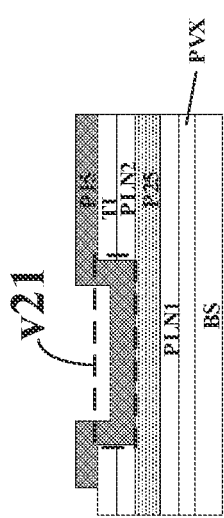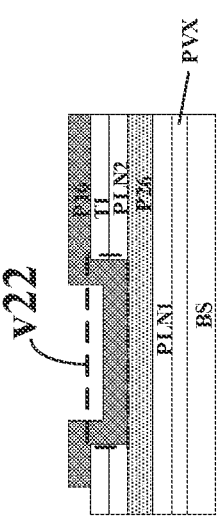
FIG. 15A
FIG. 15C

DISPLAY PANEL AND DISPLAY APPARATUS HAVING CRACK DETECTION CIRCUIT WITH CONDUCTIVE LOOP

CROSS-REFERENCE TO RELATED APPLICATION

This application is a national stage application under 35 U.S.C. § 371 of International Application No. PCT/CN2021/140751, filed Dec. 23, 2021, the contents of which are incorporated by reference in the entirety.

TECHNICAL FIELD

The present invention relates to display technology, more particularly, to a display panel and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a display panel, comprising: a touch electrode layer at least partially in a display area of the display panel; a gate-on-array in a peripheral area of the display panel; and a crack detection circuit; wherein at least a portion of signal lines in the crack detection circuit comprises a metal line in a same layer as mesh lines of the touch electrode layer.

Optionally, the crack detection circuit comprises an integrated circuit and a first conductive loop electrically connected to the integrated circuit; and the first conductive loop comprises a first touch crack sub-loop and a first panel crack sub-loop connected to each other, at least a portion of the first touch crack sub-loop being in a same layer as the mesh lines of the touch electrode layer; at least a portion of the first panel crack sub-loop being in a same layer as a gate line of the display panel.

Optionally, the display panel further comprises a voltage supply line in a part of the peripheral area; wherein the display panel comprises, sequentially arranged along a direction perpendicular to extension directions of the first touch crack sub-loop and the first panel crack sub-loop in the part of the peripheral area, signal lines of the gate-on-array, a portion of the first panel crack sub-loop, a portion of the voltage supply line, and a portion of the first touch crack sub-loop.

Optionally, the signal lines of the gate-on-array, the portion of the first panel crack sub-loop, the portion of the voltage supply line, and the portion of the first touch crack sub-loop are in a same layer.

Optionally, the portion of the voltage supply line extends along a direction substantially parallel to the extension directions of the first touch crack sub-loop and the first panel crack sub-loop in the part of the peripheral area.

Optionally, the first touch crack sub-loop comprises a first touch crack detection line and a second touch crack detection line on a same side relative to the display area, the first touch crack detection line spacing apart the second touch crack detection line from the display area; and the first touch crack detection line comprises a first-first portion and a second-first portion in different layers and connected to each other.

Optionally, the second-first portion is in a same layer as a voltage supply line in the peripheral area; and the first-first portion is in a same layer as the mesh lines of the touch electrode layer.

Optionally, the display panel comprise a row of first vias respectively extending through at least a touch insulating layer; wherein the first-first portion is connected to the second-first portion through a first-first via in the row of first vias; and multiple mesh lines of mesh electrodes of the touch electrode layer are connected to multiple touch signal lines respectively through multiple first vias in the row of first vias.

Optionally, the first-first portion is in a same layer as the mesh lines of the mesh electrodes of the touch electrode layer; and the second-first portion, the multiple touch signal lines, and a voltage supply line in the peripheral area are in a second signal line layer spaced apart from the first-first portion by at least the touch insulating layer.

Optionally, the first touch crack detection line further comprises a third-first portion connected to the second-first portion; the third-first portion comprises: a first sub-layer in a same layer as a second gate metal layer of the display panel; a second sub-layer on a side of the first sub-layer away from a base substrate, the second sub-layer in a same layer as a first signal line layer of the display panel; a third sub-layer on a side of the second sub-layer away from the first sub-layer, the third sub-layer in a same layer as a second signal line layer of the display panel; and a fourth sub-layer on a side of the third sub-layer away from the second sub-layer, the fourth sub-layer in a same layer as the mesh lines of the touch electrode layer.

Optionally, the second touch crack detection line comprises a first-second portion and a second-second portion in different layers and connected to each other; wherein the display panel comprises a row of first vias respectively extending through at least a touch insulating layer; the first-second portion is connected to the second-second portion through a second-first via in the row of first vias; mesh lines of mesh electrodes of the touch electrode layer are connected to multiple touch signal lines respectively through multiple first vias in the row of first vias; the first-second portion is in a same layer as the mesh lines of the mesh electrodes of the touch electrode layer; and the second-second portion and the multiple touch signal lines are in a second signal line layer spaced apart from the first-first portion by at least the touch insulating layer.

Optionally, the second touch crack detection line further comprises a third-second portion connected to the second-second portion; the third-second portion comprises: a fifth sub-layer in a same layer as a gate line of the display panel; a sixth sub-layer on a side of the fifth sub-layer away from a base substrate, the sixth sub-layer in a same layer as a first signal line layer of the display panel; a seventh sub-layer on a side of the sixth sub-layer away from the fifth sub-layer, the seventh sub-layer in a same layer as a second signal line layer of the display panel; and an eighth sub-layer on a side of the seventh sub-layer away from the sixth sub-layer, the eighth sub-layer in a same layer as the mesh lines of the touch electrode layer.

Optionally, the first panel crack sub-loop comprises a first panel crack detection line and a second panel crack detection line on a same side relative to the display area, the second panel crack detection line spacing apart the first panel crack detection line from the display area; and the first panel crack detection line comprises a first-third portion, a second-third portion, and a third-third portion, the second-third portion being in a layer different from the first-third portion and the third-third portion, the second-third portion connecting the first-third portion to the third-third portion.

Optionally, the first-third portion comprises at least a sub-layer in a same layer as a gate line of the display panel or in a same layer as a second gate metal layer; the second-third portion is in a same layer as a voltage supply line in the peripheral area; and the third-third portion comprises at least a sub-layer in a same layer as the second gate metal layer.

Optionally, the second panel crack detection line comprises a first-fourth portion, a second-fourth portion, and a third-fourth portion, the second-fourth portion being in a layer different from the first-fourth portion and the third-fourth portion, the second-fourth portion connecting the first-fourth portion to the third-fourth portion.

Optionally, the first-fourth portion comprises at least a sub-layer in a same layer as a gate line of the display panel or in a same layer as a second gate metal layer; the second-fourth portion is in a same layer as a voltage supply line in the peripheral area; and the third-fourth portion comprises at least a sub-layer in a same layer as the gate line of the display panel.

Optionally, the third-fourth portion is connected to a third-second portion of a second touch crack detection line of the first touch crack sub-loop.

Optionally, the display panel further comprises: a second conductive loop electrically connected to the integrated circuit; and a connecting line connecting the first conductive loop and the second conductive loop; wherein the second conductive loop comprises a second touch crack sub-loop and a second panel crack sub-loop connected to each other, at least a portion of the second touch crack sub-loop being in a same layer as the mesh lines of the touch electrode layer; at least a portion of the second panel crack sub-loop being in a same layer as a gate line of the display panel.

In another aspect, the present disclosure provides a display apparatus, comprising the display panel described herein, and a printed circuit board connected to an integrated circuit in the display panel.

BRIEF DESCRIPTION OF THE FIGURES

The following drawings are merely examples for illustrative purposes according to various disclosed embodiments and are not intended to limit the scope of the present invention.

FIG. 10A is a schematic diagram illustrating the structure of a portion of a first touch crack detection line in a part of a peripheral area of a display panel in some embodiments according to the present disclosure.

FIG. 10B is a schematic diagram illustrating the structure of a portion of a second touch crack detection line in a part of a peripheral area of a display panel in some embodiments according to the present disclosure.

FIG. 12 is a zoom-in view of a display panel in some embodiments according to the present disclosure.

FIG. 15A is a cross-sectional view along a E-E' line in FIG. 14A.

FIG. 15B is a cross-sectional view along an F-F' line in FIG. 14A.

FIG. 15C is a cross-sectional view along a G-G' line in FIG. 14B.

FIG. 15D is a cross-sectional view along a H-H' line in FIG. 14B.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a display panel and a display apparatus that substantially obviate one or more of the problems due to limitations and disadvantages of the related art. In one aspect, the present disclosure provides a display panel. In some embodiments, the display panel includes a touch electrode layer at least partially in a display area of the display panel; a gate-on-array in a peripheral area of the display panel; and a crack detection circuit. Optionally, at least a portion of signal lines in the crack detection circuit comprises a metal line in a same layer as mesh lines of the touch electrode layer.

Figure 1:
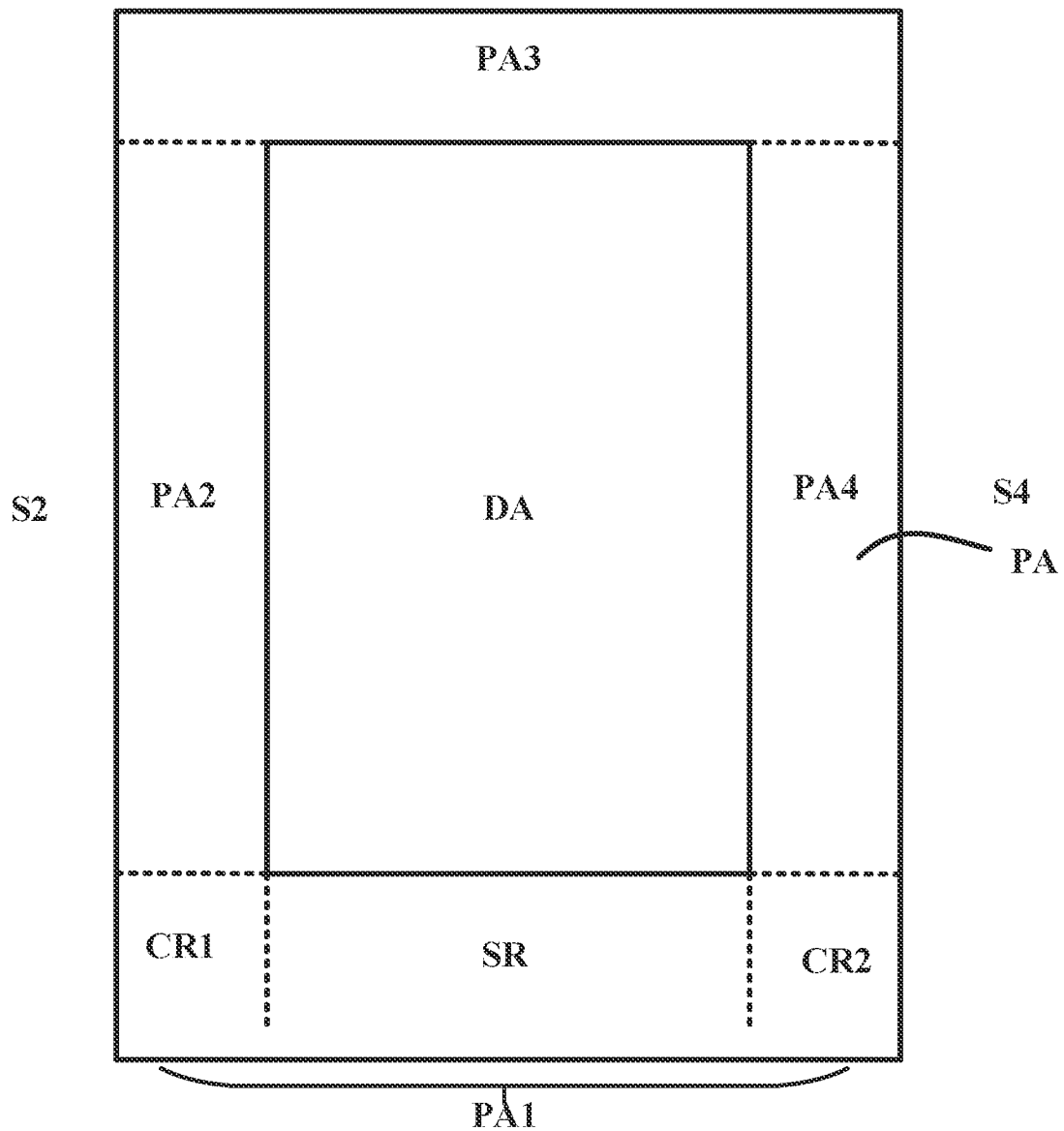
FIG. 1 is a schematic diagram illustrating a display area and a peripheral area in a display panel in some embodiments according to the present disclosure.

FIG. 1 is a schematic diagram illustrating a display area and a peripheral area in a display panel in some embodiments according to the present disclosure. Referring to FIG. 1, in some embodiments, the display apparatus includes a display area DA and a peripheral area PA. Optionally, the display area DA is substantially the same as the touch control area TCA in FIG. 4A, and the peripheral area PA is substantially the same as the peripheral area PA in FIG. 4A. In some embodiments, the peripheral area PA includes a first sub-area PA1 on a first side S1 of the display area DA, a second sub-area PA2 on a second side S2 of the display area DA, a third sub-area PA3 on a third side S3 of the display area DA, and a fourth sub-area PA4 on a fourth side S4 of the display area DA. Optionally, the first side S1 and the third side S3 are opposite to each other. Optionally, the second side S2 and the fourth side S4 are opposite to each other. Optionally, the first sub-area PA1 is a sub-area where signal lines of the crack detection circuit (e.g., the first conductive loop) are connected to an integrated circuit.

As used herein, the term "display area" refers to an area of a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

In some embodiments, the first sub-area PA1 includes a side region SR and one or more corner regions (e.g., a first corner region CR1 and a second corner region CR2). The one or more corner regions are respectively at a corner of the display panel. The one or more corner regions respectively connect the side region SR to one or more adjacent sub-areas of the peripheral area PA. For example, the first corner region CR1 connects the side region SR to the second sub-area PA2, and the second corner region CR2 connects the side region SR to the fourth sub-area PA4.

Figure 2A:
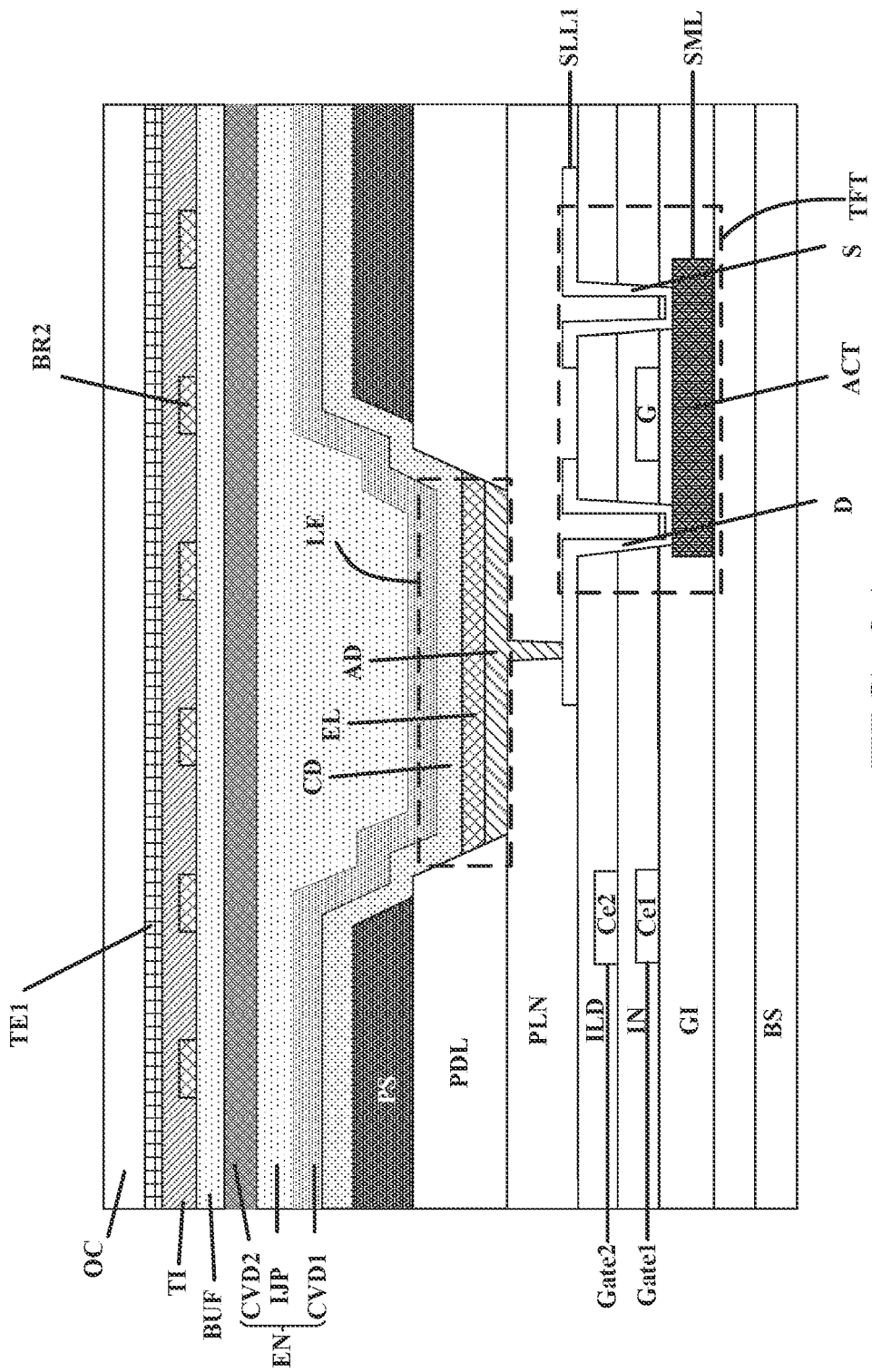
FIG. 2A illustrates a detailed structure in a display region in a display panel in some embodiments according to the present disclosure.

Various implementations of the present display panel may be practiced. FIG. 2A illustrates a detailed structure in a display region in a display panel in some embodiments according to the present disclosure. Referring to FIG. 2A, the display panel in the display region in some embodiments includes a base substrate BS (e.g., a flexible base substrate); an active layer ACT of a respective one of a plurality of thin film transistors TFT on the base substrate BS; a gate insulating layer GI on a side of the active layer ACT away from the base substrate BS; a gate electrode G and a first capacitor electrode Ce1 (both are parts of a first gate metal layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second gate metal layer) on a side of the insulating layer IN away from the gate insulating layer GI; an inter-layer dielectric layer ILD on a side of the second capacitor electrode Ce2 away from the gate insulating layer GI; a source electrode S and a drain electrode D (parts of a first SD metal layer) on a side of the inter-layer dielectric layer ILD away from the gate insulating layer GI; a planarization layer PLN on a side of the source electrode S and the drain electrode D away from the inter-layer dielectric layer ILD; a pixel definition layer PDL defining a subpixel aperture and on a side of the planarization layer PLN away from the base substrate BS; and a light emitting element LE in the subpixel aperture. The light emitting element LE includes an anode AD on a side of the planarization layer PLN away from the inter-layer dielectric layer ILD; a light emitting layer EL on a side of the anode AD away from the planarization layer PLN; and a cathode layer CD on a side of the light emitting layer EL away from the anode AD. The display panel in the display region further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer UP on a side of the first inorganic encapsulating sub-layer CVD1 away from the base substrate BS, and a second inorganic encapsulating sub-layer CVD2 on a side of the organic encapsulating sub-layer UP away from the first inorganic encapsulating sub-layer CVD1. The display panel in the display region further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI.

Figure 2B:
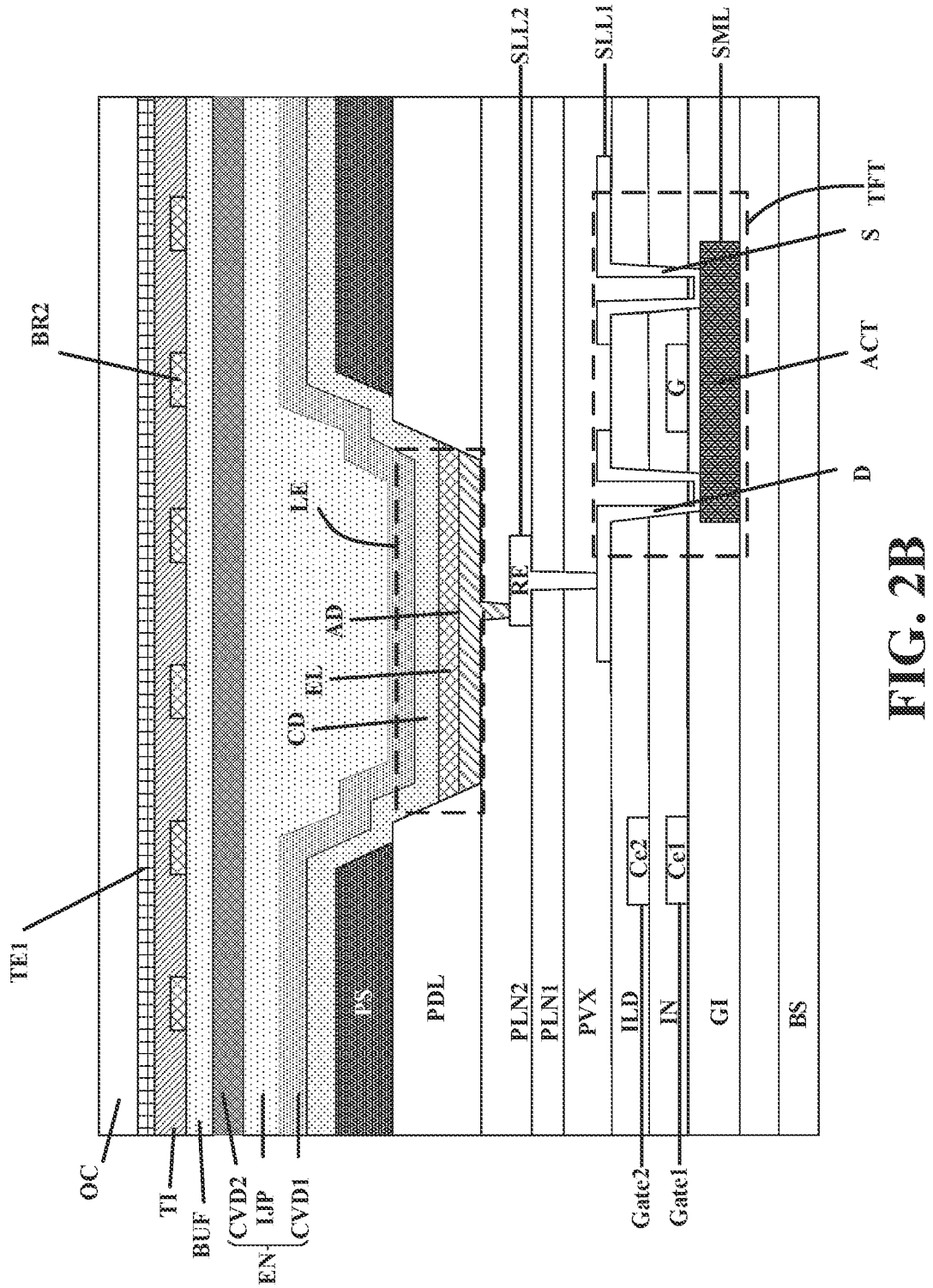
FIG. 2B illustrates a detailed structure in a display region in a display panel in some embodiments according to the present disclosure.

FIG. 2B illustrates a detailed structure in a display region in a display panel in some embodiments according to the present disclosure. Referring to FIG. 2B, the display panel in the display region in some embodiments includes a base substrate BS (e.g., a flexible base substrate); an active layer ACT of a respective one of a plurality of thin film transistors TFT on the base substrate BS; a gate insulating layer GI on a side of the active layer ACT away from the base substrate BS; a gate electrode G and a first capacitor electrode Ce1 (both are parts of a first gate metal layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second gate metal layer) on a side of the insulating layer IN away from the gate insulating layer GI; an inter-layer dielectric layer ILD on a side of the second capacitor electrode Ce2 away from the gate insulating layer GI; a source electrode S and a drain electrode D (parts of a first SD metal layer) on a side of the inter-layer dielectric layer ILD away from the gate insulating layer GI; a passivation layer PVX on a side of the source electrode S and the drain electrode D away from the inter-layer dielectric layer ILD; a first planarization layer PLN1 on a side of the passivation layer PVX away from the inter-layer dielectric layer ILD; a second planarization layer PLN2 on side of the first planarization layer PLN1 away from the passivation layer PVX; a relay electrode RE (part of a second SD metal layer) on a side of the second planarization layer PLN2 away from the first planarization layer PLN1; a pixel definition layer PDL defining a subpixel aperture and on a side of the second planarization layer PLN2 away from the base substrate BS; and a light emitting element LE in the subpixel aperture. The light emitting element LE includes an anode AD on a side of the second planarization layer PLN2 away from the first planarization layer PLN1; a light emitting layer EL on a side of the anode AD away from the second planarization layer PLN2; and a cathode layer CD on a side of the light emitting layer EL away from the anode AD. The display panel in the display region further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer UP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display panel in the display region further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI. Optionally, the display panel in the display region does not include the passivation layer PVX, e.g., the inter-layer dielectric layer ILD is in direct contact with the first planarization layer PLN1.

Referring to FIG. 2A and FIG. 2B, the display panel includes a semiconductor material layer SML, a first gate metal layer Gate1, a second gate metal layer Gate2, a first signal line layer SLL1, and a second signal line layer SLL2. The display panel further includes an insulating layer IN between the first gate metal layer Gate1 and the second gate metal layer Gate2; an inter-layer dielectric layer ILD between the second gate metal layer Gate2 and the first signal line layer SLL1; and at least a passivation layer PVX or a planarization layer PLN between the first signal line layer SLL1 and the second signal line layer SLL2.

Figure 3:
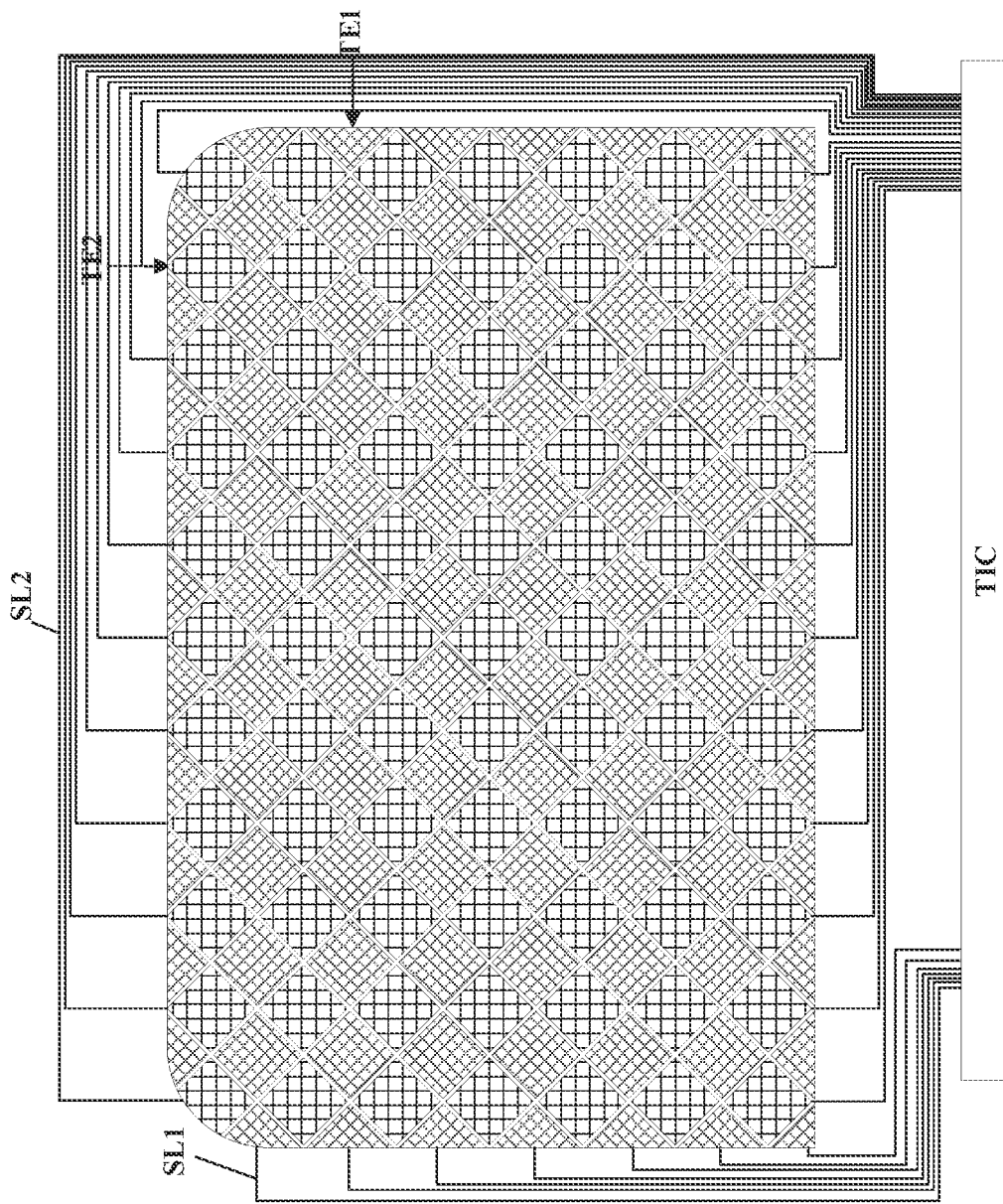
FIG. 3 is a schematic diagram illustrating the structure of a display panel having a touch control structure in some embodiments according to the present disclosure.

FIG. 3 is a schematic diagram illustrating the structure of a display panel having a touch control structure in some embodiments according to the present disclosure. In some embodiments, the touch control structure further includes a plurality of first touch signal lines SL1 respectively connected to the plurality of first mesh electrodes TE1, and a plurality of second touch signal lines SL2 respectively connected to the plurality of second mesh electrodes TE2. The display panel further includes a touch control driving integrated circuit TIC. The plurality of first touch signal lines SL1 and the plurality of second touch signal lines SL2 are connected to the touch control driving integrated circuit TIC.

Figure 4A:
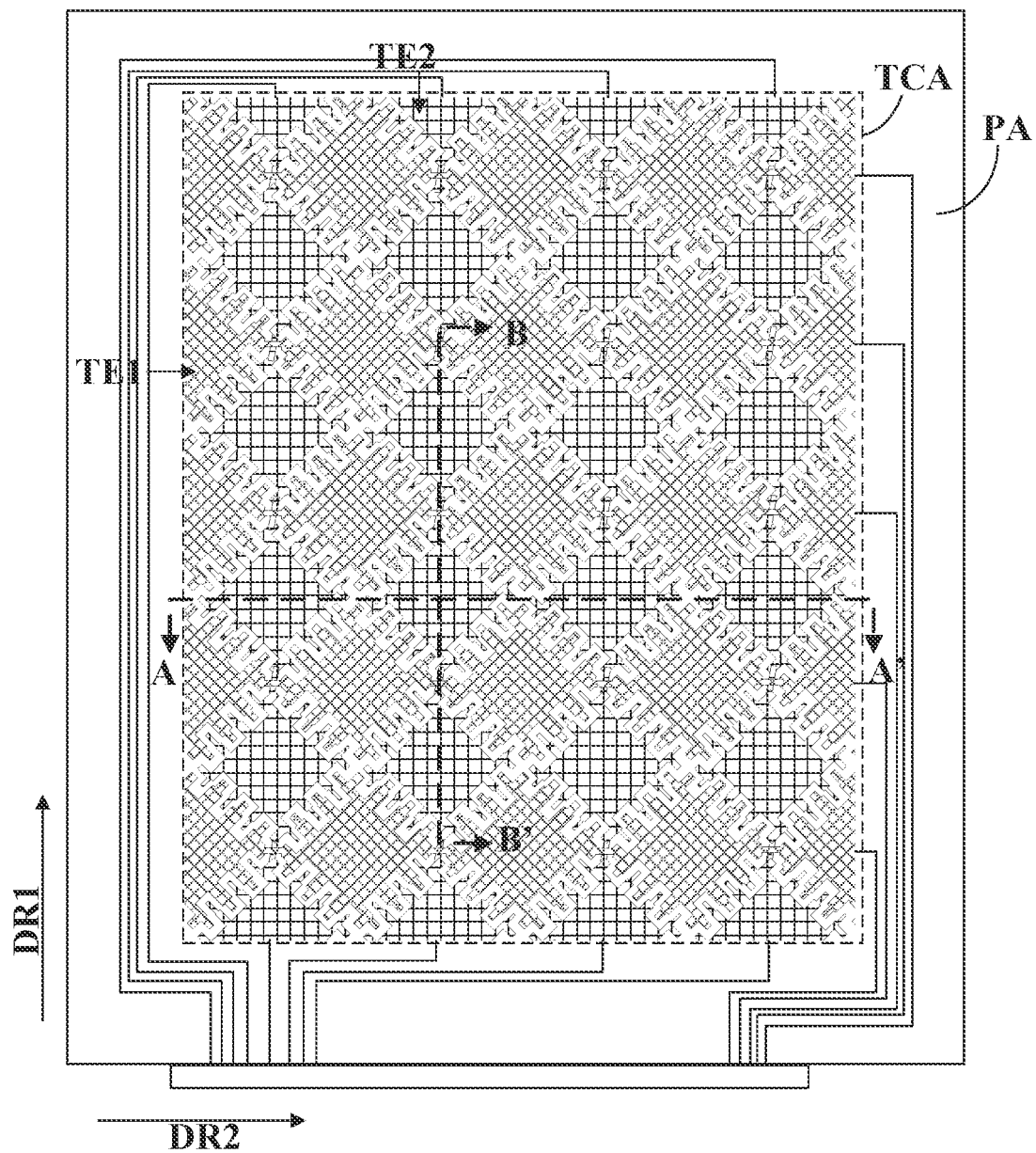
FIG. 4A is a schematic diagram illustrating the structure of a touch control structure in some embodiments according to the present disclosure.

FIG. 4A is a schematic diagram illustrating the structure of a touch control structure in a display panel in some embodiments according to the present disclosure. Referring to FIG. 4A, the touch control structure in some embodiments includes a plurality of first mesh electrodes TE1 arranged in a plurality of rows and a plurality of second mesh electrodes TE2 arranged in a plurality of columns. Adjacent rows of the plurality of rows are isolated from each other. Adjacent columns of the plurality of columns are isolated from each other. Optionally, the touch control structure is a mutual capacitance type touch control structure. Optionally, the plurality of first mesh electrodes TE1 are a plurality of touch sensing electrodes, and the plurality of second mesh electrodes TE2 are a plurality of touch scanning electrodes. Optionally, the plurality of first mesh electrodes TE1 are a plurality of touch scanning electrodes, and the plurality of second mesh electrodes TE2 are a plurality of touch sensing electrodes.

In some embodiments, the respective one of the plurality of first mesh electrodes TE1 extends along a second direction DR2; and the respective one of the plurality of second mesh electrodes TE2 extends along a first direction DR1. Optionally, the first direction DR1 and the second direction DR2 are two non-parallel directions, for example, the first direction DR1 and the second direction DR2 cross over each other. Optionally, the first direction DR1 and the second direction DR2 are perpendicular to each other. Optionally, the first direction DR1 and the second direction DR2 cross over each other at an inclined angle that is not 90 degrees.

Figure 4B:
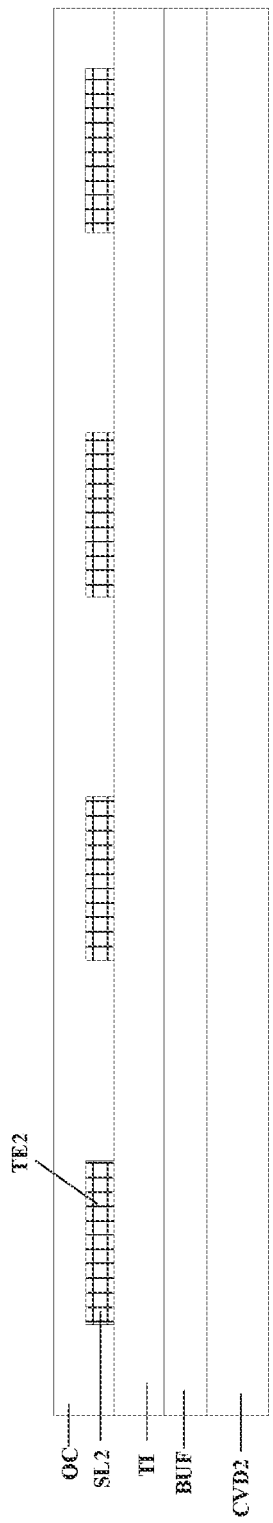
FIG. 4B is a cross-sectional view along an A-A' line in FIG. 4A.
Figure 4C:
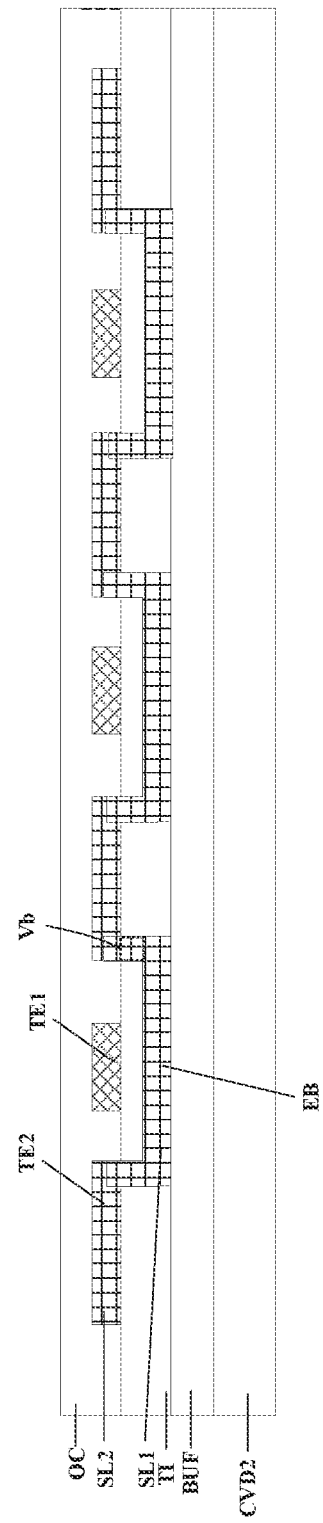
FIG. 4C is a cross-sectional view along a B-B' line in FIG. 4A.

FIG. 4B is a cross-sectional view along an A-A' line in FIG. 4A. FIG. 4C is a cross-sectional view along a B-B' line in FIG. 4A. As shown in FIG. 4A, FIG. 4B, and FIG. 4C, in some embodiments, the touch control structure includes a plurality of first mesh electrodes TE1 arranged in a plurality of rows and a plurality of second mesh electrodes TE2 arranged in a plurality of columns. The plurality of first mesh electrodes TE1 and the plurality of second mesh electrodes TE2 are in the second layer SL2. The touch control structure further includes a plurality of touch electrode bridges EB in the first layer SL1; and vias Vb extending through the touch insulating layer TI. Optionally, the plurality of touch electrode bridges EB respectively extend through the vias Vb to respectively connect adjacent second mesh blocks in a respective column of the plurality of column of the plurality of second mesh electrodes TE2.

In some embodiments, the present display panel further includes a crack detection circuit. The crack detection circuit according to the present disclosure can not only detect cracks in the thin film transistor array substrate of the display panel, but also can detect cracks independently occurring in the touch control structure or adjacent layers. The inventors of the present disclosure discover a sophisticated circuit structure that can accurately detect cracks in the display panel with exceptionally high efficiency.

Figure 5:
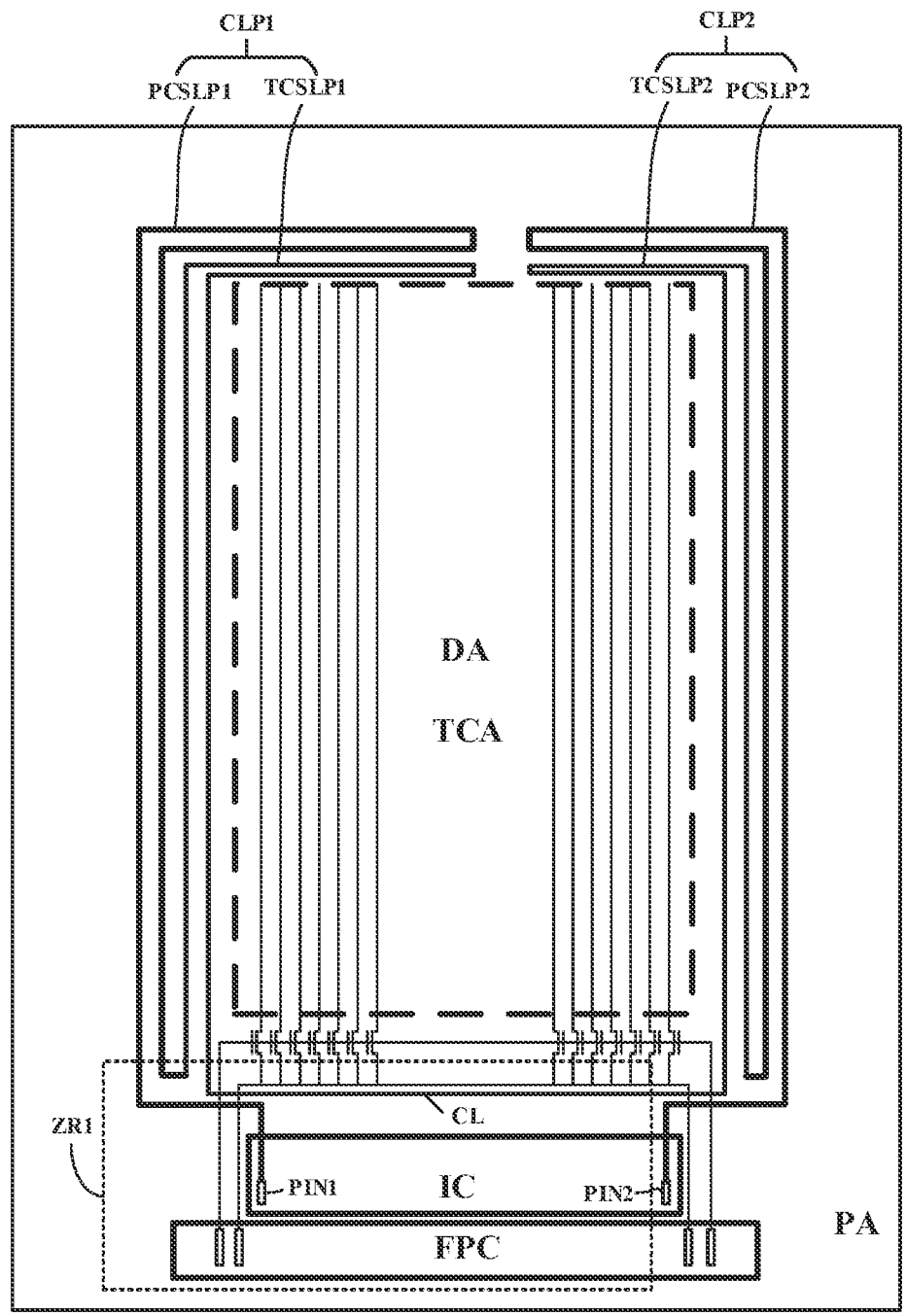
FIG. 5 is a schematic diagram illustrating the structure of a display panel in some embodiments according to the present disclosure.

FIG. 5 is a schematic diagram illustrating the structure of a display panel in some embodiments according to the present disclosure. Referring to FIG. 5, in some embodiments, the crack detection circuit includes a first conductive loop CLP1 electrically connected to the integrated circuit IC. In one example, the first conductive loop CLP1 is connected to a first pin PIN1 in the integrated circuit IC. Optionally, the crack detection circuit further includes a second conductive loop CLP2 electrically connected to the integrated circuit IC. In another example, the second conductive loop CLP2 is connected to a second pin PIN2 in the integrated circuit IC. As shown in FIG. 5, the first conductive loop CLP1 in some embodiments includes a first touch crack sub-loop TCSLP1 and a first panel crack sub-loop PCSLP1 connected to each other.

Figure 6:
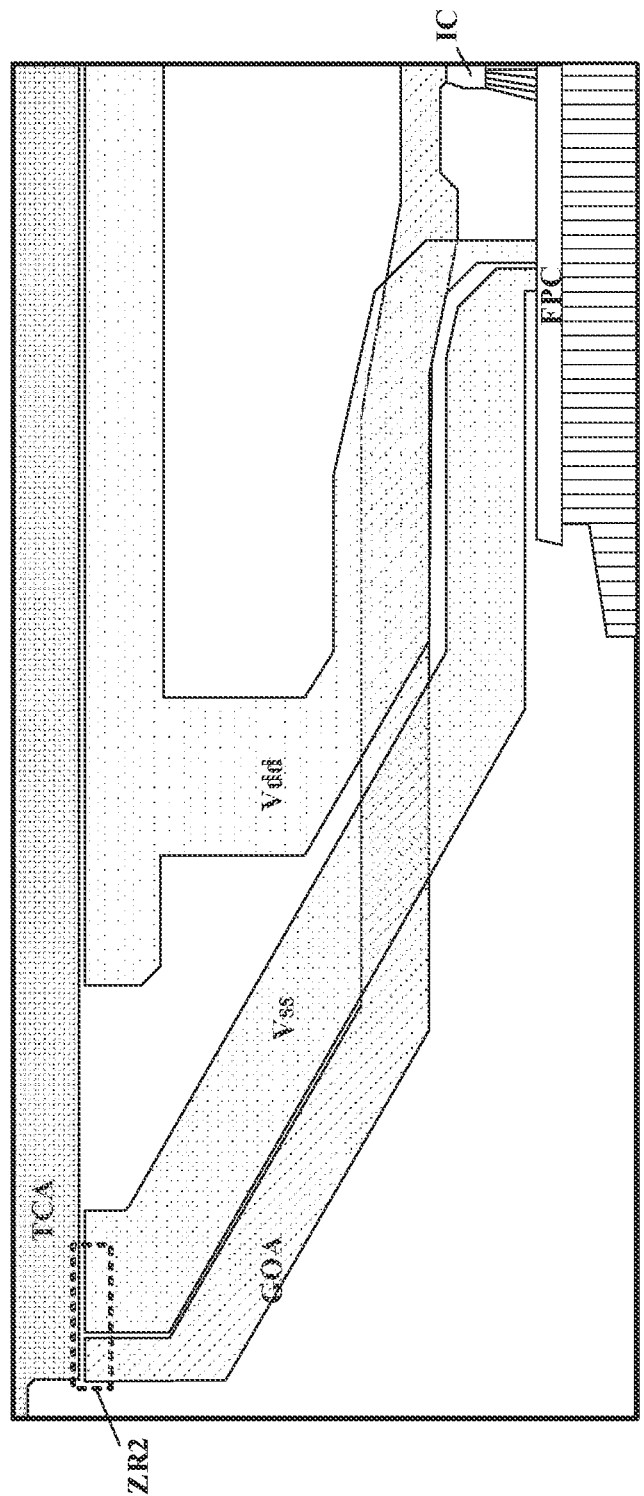
FIG. 6 is a zoom-in view in a first zoom-in region ZR1 in FIG. 5.

FIG. 6 is a zoom-in view in a first zoom-in region ZR1 in FIG. 5. Referring to FIG. 6, in the peripheral area, the display panel includes a gate-on-array GOA, a voltage supply line Vss, and a second voltage supply line Vdd. The voltage supply line Vss in one example is a low voltage supply line, for example, configured to provide a low voltage to cathodes of light emitting elements in the display area. The second voltage supply line Vdd in another example is a high voltage supply line, for example, configured to provide a high voltage to pixel driving circuits in the display panel. In one example, the high voltage is provided to a source electrode of a driving transistor in a respective pixel driving circuit. The integrated circuit IC and a flexible printed circuit board FPC are also shown in FIG. 6.

Figures 7A, 7B:
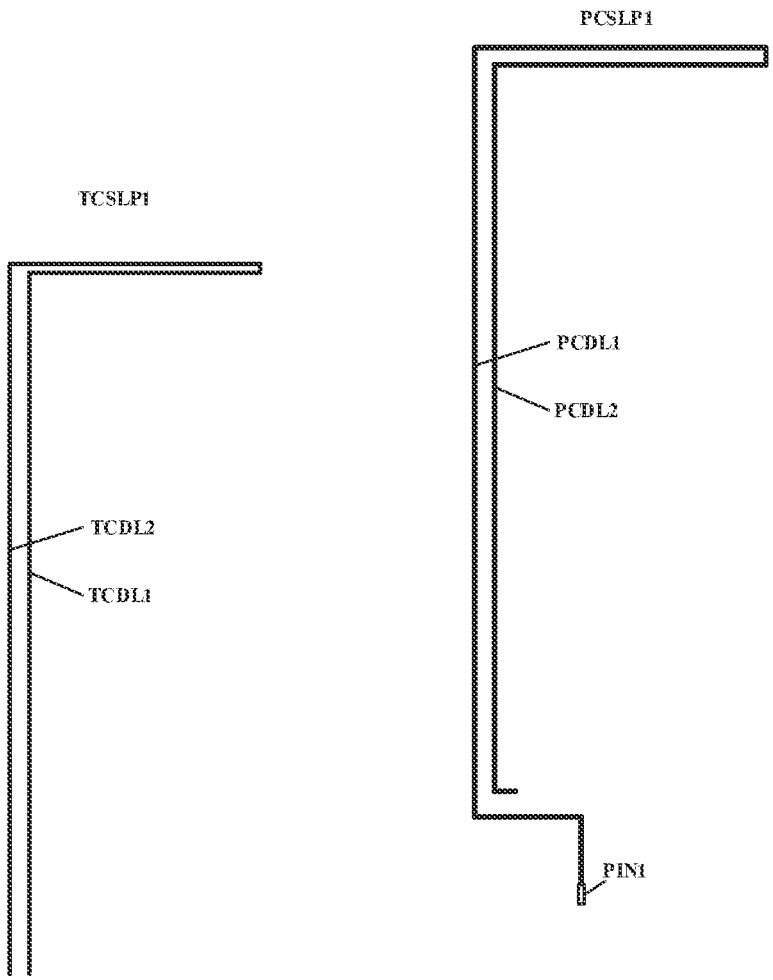
FIG. 7A is a schematic diagram illustrating the structure of a first touch crack sub-loop in some embodiments according to the present disclosure.
FIG. 7B is a schematic diagram illustrating the structure of a first panel crack sub-loop in some embodiments according to the present disclosure.

FIG. 7A is a schematic diagram illustrating the structure of a first touch crack sub-loop in some embodiments according to the present disclosure. Referring to FIG. 7A, FIG. 1, and FIG. 5, in some embodiments, the first conductive loop CLP1 includes a first touch crack detection line TCDL1 and a second touch crack detection line TCDL2. The first touch crack detection line TCDL1 and the second touch crack detection line TCDL2 are on a same side relative to the display area DA. In one example, the first touch crack detection line TCDL1 spaces apart the second touch crack detection line TCDL2 from the display area DA.

In some embodiments, the first touch crack detection line TCDL1 and the second touch crack detection line TCDL2 respectively extend from a first sub-area PA1 through a second sub-area PA2 into a third sub-area PA3 of a peripheral area PA of the display panel. More specifically, the first touch crack detection line TCDL1 extends from a first sub-area PA1, through a second sub-area PA2, into a third sub-area PA3 of a peripheral area PA of the display panel; and the second touch crack detection line TCDL2 extends from the third sub-area PA3, through the second sub-area PA2, back into the first sub-area PA1.

In some embodiments, at least a portion of the first touch crack sub-loop TCSLP1 is in a same layer as the mesh lines of the touch electrode layer. Referring to FIG. 7A, FIG. 4B, and FIG. 4C, the first touch crack detection line TCDL1 and the second touch crack detection line TCDL2 are at least partially in the second layer SL2, which includes mesh blocks of the touch electrode layer, e.g., mesh blocks of the plurality of first mesh electrodes TE1 and the plurality of second mesh electrodes TE2.

FIG. 7B is a schematic diagram illustrating the structure of a first panel crack sub-loop in some embodiments according to the present disclosure. Referring to FIG. 7B, FIG. 1, and FIG. 5, in some embodiments, the first panel crack sub-loop PCSLP1 includes a first panel crack detection line PCDL1 and a second panel crack detection line PCDL2. The first panel crack detection line PCDL1 and the second panel crack detection line PCDL2 are on a same side relative to the display area DA. In one example, the second panel crack detection line PCDL2 spaces apart the first panel crack detection line PCDL1 from the display area DA.

In some embodiments, the first panel crack detection line PCDL1 and the second panel crack detection line PCDL2 respectively extend from a first sub-area PA1 through a second sub-area PA2 into a third sub-area PA3 of a peripheral area PA of the display panel. More specifically, the first panel crack detection line PCDL1 extends from a first sub-area PA1, through a second sub-area PA2, into a third sub-area PA3 of a peripheral area PA of the display panel; and the second panel crack detection line PCDL2 extends from the third sub-area PA3, through the second sub-area PA2, back into the first sub-area PA1. In one example, a first terminal of the first panel crack sub-loop PCSLP1 (the terminal of the second panel crack detection line PCDL2) is connected to the second touch crack detection line TCDL2; and a second terminal of the first panel crack sub-loop PCSLP1 (the terminal of the first panel crack detection line PCDL1) is connected to the integrated circuit IC.

In some embodiments, the first touch crack detection line TCDL1 and the second touch crack detection line TCDL2 space apart the first panel crack sub-loop PCSLP1 from the display area DA. The first panel crack sub-loop PCSLP1 is on a side of the first touch crack detection line TCDL1 and the second touch crack detection line TCDL2 away from the display area DA. Optionally, the first panel crack sub-loop PCSLP1 (including the first panel crack detection line PCDL1 and the second panel crack detection line PCDL2), the first touch crack detection line TCDL1, and the second touch crack detection line TCDL2 are on a same side relative to the display area DA.

In some embodiments, the first touch crack sub-loop TCSLP1 is configured to detect a crack in layers adjacent to the touch control structure, whereas the first panel crack sub-loop PCSLP1 is configured to detect a crack in a thin film transistor array substrate of the display panel. Optionally, the first panel crack sub-loop PCSLP1 is in a layer in a thin film transistor array substrate.

Referring to FIG. 2B, in some embodiments, a respective one of the plurality of thin film transistors TFT includes a gate electrode G. The display panel further includes a first capacitor electrode Ce1 of a storage capacitor in a same layer as the gate electrode G; a gate insulating layer GI on a side of the gate electrode G and the first capacitor electrode Ce1 close to the base substrate BS; a second capacitor electrode Ce2 of the storage capacitor on a side of the gate insulating layer GI away from the base substrate BS; and an insulating layer IN on a side of the second capacitor electrode Ce2 close to the base substrate BS. In another example, at least a portion of the first panel crack sub-loop PCSLP1 is in a same layer as the gate electrode G (and in a same layer as a gate line which is in a same layer as the gate electrode G), and is between the gate insulating layer GI and the insulating layer IN. In another example, at least a portion of the first panel crack sub-loop PCSLP1 is in a same layer as the second capacitor electrode Ce2, and is between the insulating layer IN and an inter-layer dielectric layer ILD. In another example, at least a portion of the second panel crack sub-loop PCSLP2 includes a first sub-layer in a same layer as the gate electrode G, and a second sub-layer in a same layer as the second capacitor electrode Ce2.

Figures 7C, 7D:
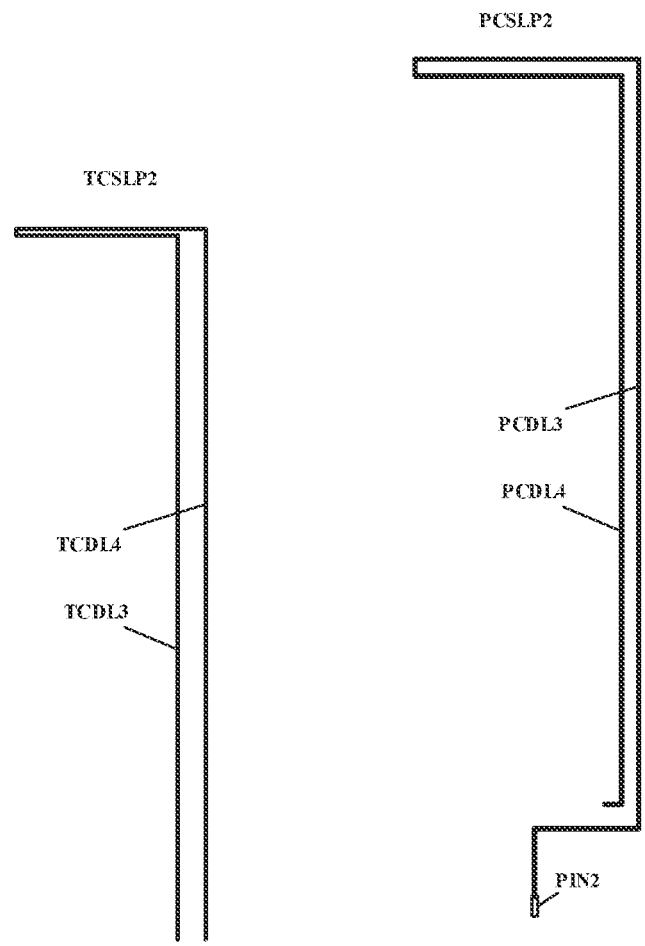
FIG. 7C is a schematic diagram illustrating the structure of a second touch crack sub-loop in some embodiments according to the present disclosure.
FIG. 7D is a schematic diagram illustrating the structure of a second panel crack sub-loop in some embodiments according to the present disclosure.

FIG. 7C is a schematic diagram illustrating the structure of a second touch crack sub-loop in some embodiments according to the present disclosure. Referring to FIG. 7C, FIG. 1, and FIG. 5, in some embodiments, the second conductive loop CLP2 includes a third touch crack detection line TCDL3 and a fourth touch crack detection line TCDL4. The third touch crack detection line TCDL3 and the fourth touch crack detection line TCDL4 are on a same side relative to the display area DA. In one example, the third touch crack detection line TCDL3 spaces apart the fourth touch crack detection line TCDL4 from the display area DA.

In some embodiments, the third touch crack detection line TCDL3 and the fourth touch crack detection line TCDL4 respectively extend from a first sub-area PA1 through a fourth sub-area PA4 into a third sub-area PA3 of a peripheral area PA of the display panel. More specifically, the third touch crack detection line TCDL3 extends from a first sub-area PA1, through a fourth sub-area PA4, into a third sub-area PA3 of a peripheral area PA of the display panel; and the fourth touch crack detection line TCDL4 extends from the third sub-area PA3, through the fourth sub-area PA4, back into the first sub-area PA1.

In some embodiments, at least a portion of the second touch crack sub-loop TCSLP2 is in a same layer as the mesh lines of the touch electrode layer. Referring to FIG. 7, FIG. 4B, and FIG. 4C, the third touch crack detection line TCDL3 and the fourth touch crack detection line TCDL4 are at least partially in the second layer SL2, which includes mesh blocks of the touch electrode layer, e.g., mesh blocks of the plurality of first mesh electrodes TE1 and the plurality of second mesh electrodes TE2.

FIG. 7D is a schematic diagram illustrating the structure of a second panel crack sub-loop in some embodiments according to the present disclosure. Referring to FIG. 7D, FIG. 1, and FIG. 5, in some embodiments, the second panel crack sub-loop PCSLP2 includes a third panel crack detection line PCDL3 and a fourth panel crack detection line PCDL4. The third panel crack detection line PCDL3 and the fourth panel crack detection line PCDL4 are on a same side relative to the display area DA. In one example, the fourth panel crack detection line PCDL4 spaces apart the third panel crack detection line PCDL3 from the display area DA.

In some embodiments, the third panel crack detection line PCDL3 and the fourth panel crack detection line PCDL4 respectively extend from a first sub-area PA1 through a fourth sub-area PA4 into a third sub-area PA3 of a peripheral area PA of the display panel. More specifically, the third panel crack detection line PCDL3 extends from a first sub-area PA1, through a fourth sub-area PA4, into a third sub-area PA3 of a peripheral area PA of the display panel; and the fourth panel crack detection line PCDL4 extends from the third sub-area PA3, through the fourth sub-area PA4, back into the first sub-area PA1. In one example, a first terminal of the second panel crack sub-loop PCSLP2 (the terminal of the fourth panel crack detection line PCDL4) is connected to the fourth touch crack detection line TCDL4; and a second terminal of the second panel crack sub-loop PCSLP2 (the terminal of the third panel crack detection line PCDL3) is connected to the integrated circuit IC.

In some embodiments, the third touch crack detection line TCDL3 and the fourth touch crack detection line TCDL4 space apart the second panel crack sub-loop PCSLP2 from the display area DA. The second panel crack sub-loop PCSLP2 is on a side of the third touch crack detection line TCDL3 and the fourth touch crack detection line TCDL4 away from the display area DA. Optionally, the second panel crack sub-loop PCSLP2 (including the third panel crack detection line PCDL3 and the fourth panel crack detection line PCDL4), the third touch crack detection line TCDL3, and the fourth touch crack detection line TCDL4 are on a same side relative to the display area DA.

In some embodiments, the second touch crack sub-loop TCSLP2 is configured to detect a crack in layers adjacent to the touch control structure, whereas the second panel crack sub-loop PCSLP2 is configured to detect a crack in a thin film transistor array substrate of the display panel. Optionally, the second panel crack sub-loop PCSLP2 is in a layer in a thin film transistor array substrate.

Referring to FIG. 2B, in some embodiments, a respective one of the plurality of thin film transistors TFT includes a gate electrode G. The display panel further includes a first capacitor electrode Ce1 of a storage capacitor in a same layer as the gate electrode G; a gate insulating layer GI on a side of the gate electrode G and the first capacitor electrode Ce1 close to the base substrate BS; a second capacitor electrode Ce2 of the storage capacitor on a side of the gate insulating layer GI away from the base substrate BS; and an insulating layer IN on a side of the second capacitor electrode Ce2 close to the base substrate BS. In another example, at least a portion of the second panel crack sub-loop PCSLP2 is in a same layer as the gate electrode G (and in a same layer as a gate line which is in a same layer as the gate electrode G), and is between the gate insulating layer GI and the insulating layer IN. In another example, at least a portion of the second panel crack sub-loop PCSLP2 is in a same layer as the second capacitor electrode Ce2, and is between the insulating layer IN and an inter-layer dielectric layer ILD. In another example, at least a portion of the second panel crack sub-loop PCSLP2 includes a first sub-layer in a same layer as the gate electrode G, and a second sub-layer in a same layer as the second capacitor electrode Ce2.

Figure 8:
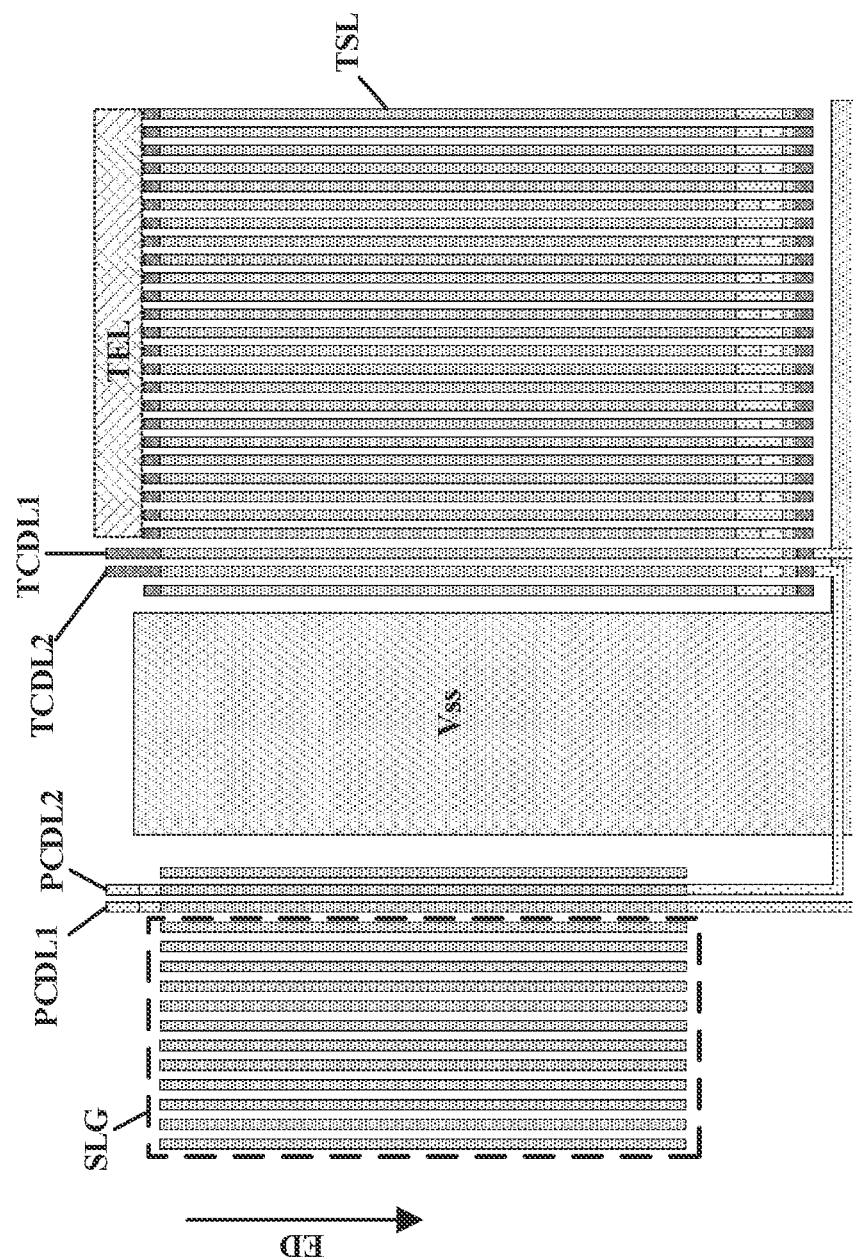
FIG. 8 is a zoom-in view in a second zoom-in region ZR2 in FIG. 6.

FIG. 8 is a zoom-in view in a second zoom-in region ZR2 in FIG. 6. Referring to FIG. 5, FIG. 6, and FIG. 8, in a part of the peripheral area (e.g., the first corner region CR1 as depicted in FIG. 1), the display panel includes a gate-on-array GOA. Multiple signal lines SLG of the gate-on-array GOA are depicted in FIG. 8. Referring to FIG. 6 and FIG. 8, in some embodiments, signal lines of the crack detection circuit do not cross over the gate-on-array GOA in at least the side region (denoted as SR in FIG. 1) of the peripheral area. Optionally, in at least the side region of the peripheral area, an orthographic projection of all signal lines in the crack detection circuit on a base substrate is non-overlapping with the orthographic projection of the gate-on-array GOA on the base substrate. In particular, in some embodiments, at least a portion of signal lines in the crack detection circuit includes a metal line in a same layer as mesh lines of the touch electrode layer; and, in at least the side region of the peripheral area, an orthographic projection of the portion of the signal lines in the crack detection circuit on a base substrate is non-overlapping with an orthographic projection of the gate-on-array GOA on the base substrate.

The inventors of the present disclosure discover that, in related display panels, at least some signal lines of the crack detection circuit cross over signal lines of the gate-on-array GOA. Particularly when the signal lines of the crack detection circuit includes a sub-layer in a same layer as the touch electrode layer, electrostatic discharge is prone to occur during fabrication process of the display panel. Because the sub-layer crosses over the gate-on-array GOA, the electrostatic discharge is prone to cause damages in the gate-on-array GOA. The crack detection circuit in the present display panel has an intricate structure that perfectly obviates the issues in the related display panels.

Referring to FIG. 6 and FIG. 8, the display panel includes a voltage supply line Vss in a part of the peripheral area. In some embodiments, the display panel includes, sequentially arranged along a direction perpendicular to extension directions ED of the first touch crack sub-loop (the first touch crack detection line TCDL1 and the second touch crack detection line TCDL2) and the first panel crack sub-loop (the first panel crack detection line PCDL1 and the second panel crack detection line PCDL2) in the part of the peripheral area, signal lines SLG of the gate-on-array GOA, a portion of a first panel crack sub-loop (portions of the first panel crack detection line PCDL1 and the second panel crack detection line PCDL2), a portion of the voltage supply line Vss, and a portion of the first touch crack sub-loop (portions of the first touch crack detection line TCDL1 and the second touch crack detection line TCDL2). Optionally, the display panel includes, sequentially arranged along a direction perpendicular to extension directions ED of the first touch crack sub-loop (the first touch crack detection line TCDL1 and the second touch crack detection line TCDL2) and the first panel crack sub-loop (the first panel crack detection line PCDL1 and the second panel crack detection line PCDL2) in the part of the peripheral area, signal lines SLG of the gate-on-array GOA, a portion of a first panel crack sub-loop (portions of the first panel crack detection line PCDL1 and the second panel crack detection line PCDL2), a portion of the voltage supply line Vss, a portion of the first touch crack sub-loop (portions of the first touch crack detection line TCDL1 and the second touch crack detection line TCDL2), and multiple touch signal lines TSL.

Figure 9:
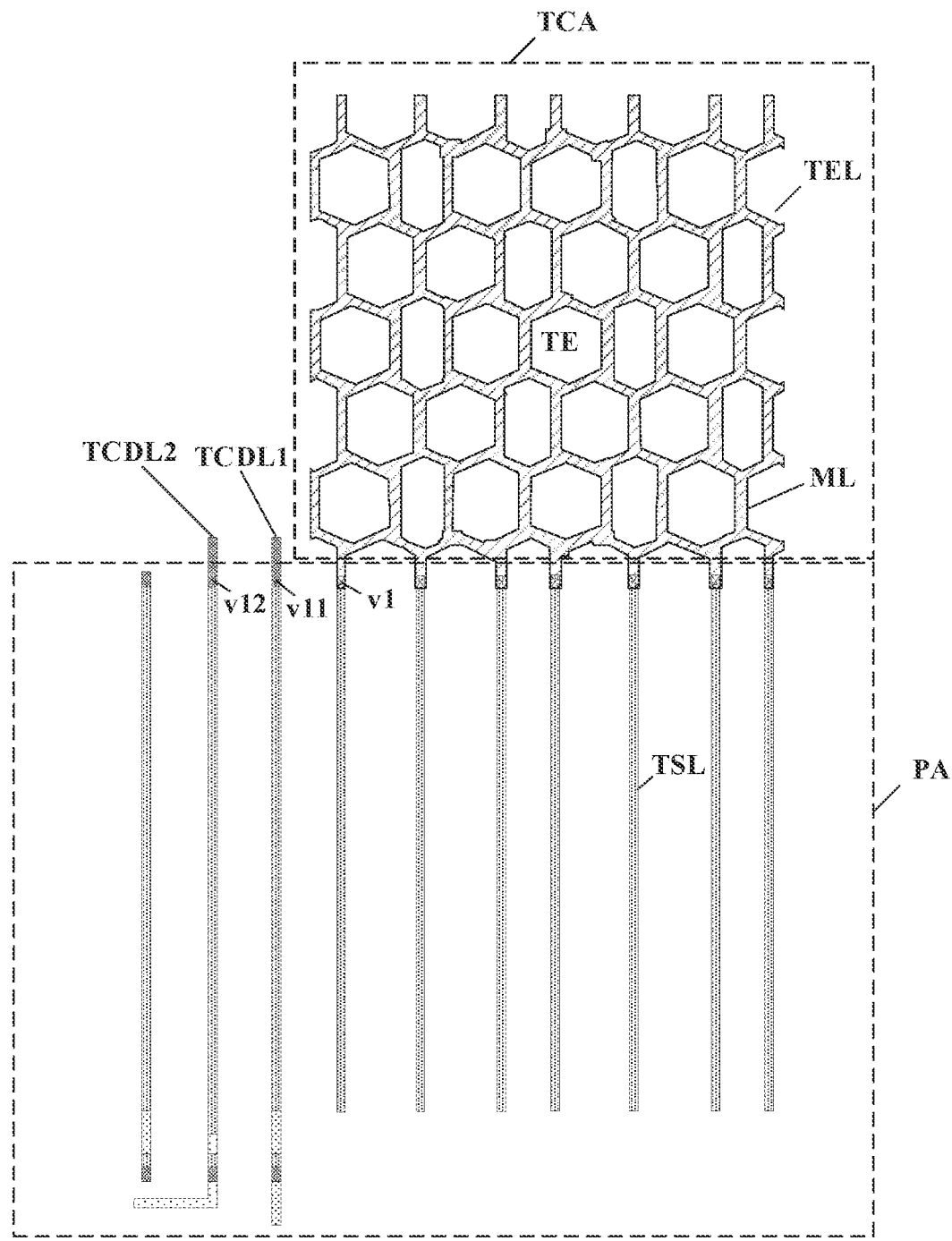
FIG. 9 illustrates connection between mesh lines of a touch electrode layer and multiple touch signal lines in some embodiments according to the present disclosure.

FIG. 9 illustrates connection between mesh lines of a touch electrode layer and multiple touch signal lines in some embodiments according to the present disclosure. Referring to FIG. 9, in a touch control area TCA, the display panel includes a touch electrode layer TEL. The touch electrode layer TEL includes a plurality of touch electrodes TE. The plurality of touch electrodes in some embodiments are mesh electrodes. Mesh lines ML of the touch electrode layer TEL are connected to multiple touch signal lines TSL. The multiple touch signal lines TSL connect the mesh electrodes in the touch electrode layer TEL to an integrated circuit (e.g., a touch control integrated circuit).

In some embodiments, the signal lines SLG of the gate-on-array GOA, the portion of a first panel crack sub-loop, the portion of the voltage supply line Vss, and the portion of the first touch crack sub-loop are in a same layer. In one example, the signal lines SLG of the gate-on-array GOA, the portion of a first panel crack sub-loop, the portion of the voltage supply line Vss, and the portion of the first touch crack sub-loop are in the second signal line layer (SLL2 in FIG. 2B). Optionally, the signal lines SLG of the gate-on-array GOA, the portion of a first panel crack sub-loop, the portion of the voltage supply line Vss, the portion of the first touch crack sub-loop, and the multiple touch signal lines TSL are in a same layer. In another example, the signal lines SLG of the gate-on-array GOA, the portion of a first panel crack sub-loop, the portion of the voltage supply line Vss, the portion of the first touch crack sub-loop, and the multiple touch signal lines TSL are in the second signal line layer (SLL2 in FIG. 2B).

Referring to FIG. 8, in some embodiments, the portion of the voltage supply line Vss extends along a direction substantially parallel to the extension directions ED of the first touch crack sub-loop and the first panel crack sub-loop in the part of the peripheral area.

FIG. 10A is a schematic diagram illustrating the structure of a portion of a first touch crack detection line in a part of a peripheral area of a display panel in some embodiments according to the present disclosure. Referring to FIG. 10A, FIG. 8, FIG. 9, FIG. 7A, and FIG. 5, the first touch crack detection line TCDL1 in some embodiments includes a first-first portion P11 and a second-first portion P21 in different layers and connected to each other. In one example, the first-first portion P11 is in a same layer as the mesh lines ML of the touch electrode layer TEL, for example, in a same layer as the plurality of first touch electrodes TE1 in FIG. 2A and FIG. 2B. In another example, the second-first portion P21 is in a same layer as a voltage supply line Vss in the peripheral area, for example, in a same layer as the second signal line layer SLL2 in FIG. 2B.

Referring to FIG. 9, the display panel in some embodiments includes a row of first vias v1 extending through at least a touch insulating layer. Multiple mesh lines ML of mesh electrodes of the touch electrode layer TEL are connected to multiple touch signal lines TSL respectively through multiple first vias in the row of first vias v1. Referring to FIG. 9 and FIG. 10A, the first-first portion P11 is connected to the second-first portion P21 through a first-first via v11 in the row of first vias v1.

Figures 10C, 10D:
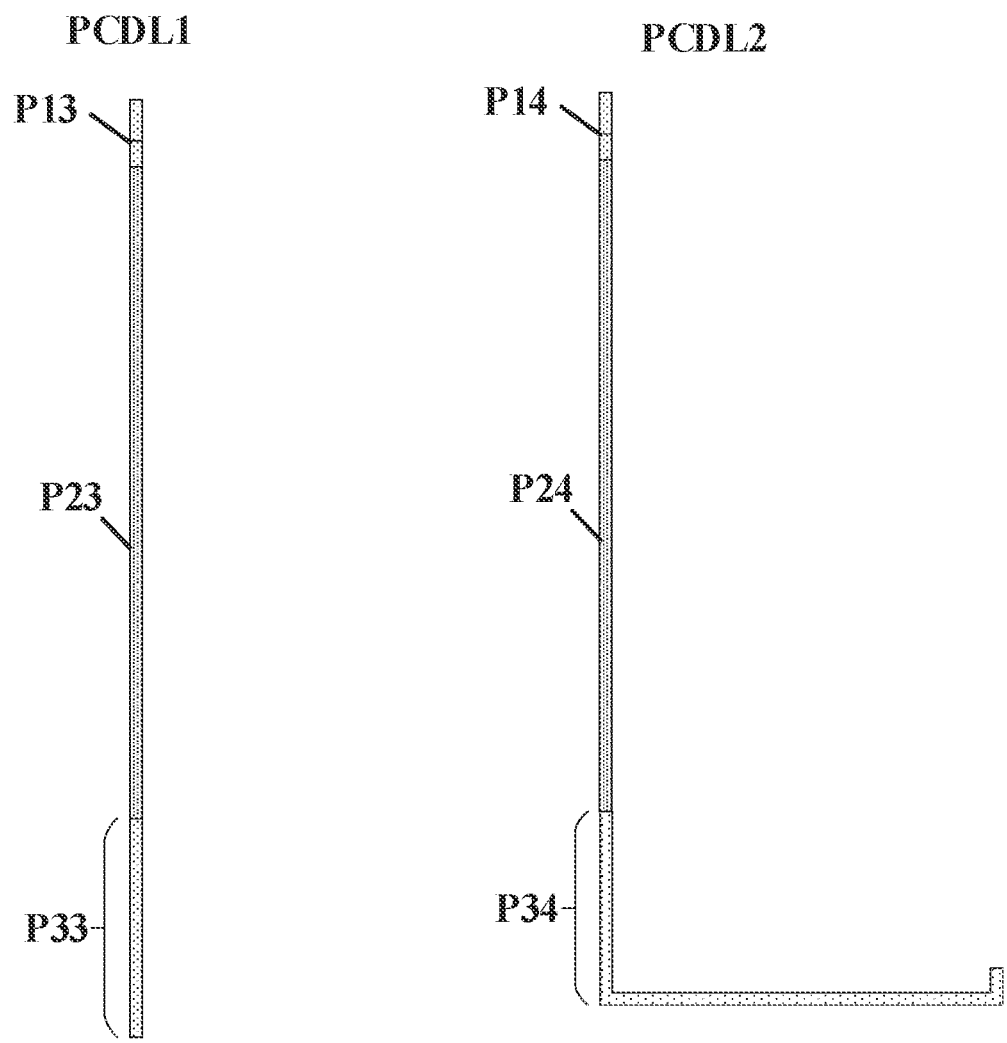
FIG. 10C is a schematic diagram illustrating the structure of a portion of a first panel crack detection line in a part of a peripheral area of a display panel in some embodiments according to the present disclosure.
FIG. 10D is a schematic diagram illustrating the structure of a portion of a second panel crack detection line in a part of a peripheral area of a display panel in some embodiments according to the present disclosure.
Figure 11A:
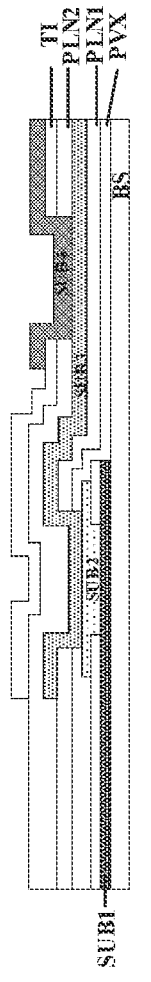
FIG. 11A is a cross-sectional view along an A-A' line in FIG. 10A.

FIG. 11A is a cross-sectional view along an A-A' line in FIG. 10A. Referring to FIG. 11A and FIG. 10A, the first-first via v11 extends through the touch insulating layer TI and the second planarization layer PLN2. The first-first portion P11 is connected to the second-first portion P21 through the first-first via v11.

In some embodiments, the first-first portion P11 is in a same layer as the mesh lines ML of the touch electrode layer TEL. The second-first portion P21, the multiple touch signal lines TSL, and a voltage supply line Vss in the peripheral area are in a second signal line layer (SLL2 in FIG. 2B). The second signal line layer is spaced apart from the first-first portion P11 by at least the touch insulating layer (TI in FIG. 2B).

Figure 11B:
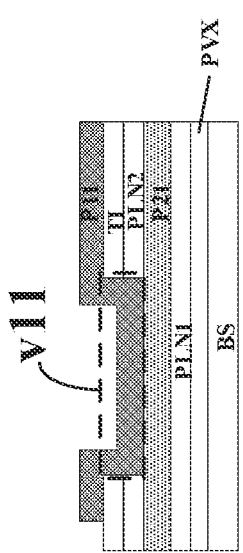
FIG. 11B is a cross-sectional view along a B-B' line in FIG. 10A.

In some embodiments, the first touch crack detection line TCDL1 further includes a third-first portion P31 connected to the second-first portion P21. FIG. 11B is a cross-sectional view along a B-B' line in FIG. 10A. Referring to FIG. 11B, the third-first portion P31 in some embodiments includes a first sub-layer SUB1 in a same layer as a second gate metal layer (Gate2 in FIG. 2A and FIG. 2B) of the display panel; a second sub-layer SUB2 on a side of the first sub-layer SUB1 away from a base substrate BS, the second sub-layer SUB2 in a same layer as a first signal line layer (SLL1 in FIG. 2A and FIG. 2B) of the display panel; a third sub-layer SUB3 on a side of the second sub-layer SUB2 away from the first sub-layer SUB1, the third sub-layer SUB3 in a same layer as a second signal line layer (SLL2 in FIG. 2B) of the display panel; and a fourth sub-layer SUB4 on a side of the third sub-layer SUB3 away from the second sub-layer SUB2, the fourth sub-layer SUB4 in a same layer as the mesh lines of the touch electrode layer. Referring to FIG. 11B, the second sub-layer SUB2 connects the first sub-layer SUB1 to the third sub-layer SUB3; and the third sub-layer SUB3 connects the second sub-layer SUB2 to the fourth sub-layer SUB4.

FIG. 10B is a schematic diagram illustrating the structure of a portion of a second touch crack detection line in a part of a peripheral area of a display panel in some embodiments according to the present disclosure. Referring to FIG. 10B, FIG. 8, FIG. 9, FIG. 7A, and FIG. 5, the second touch crack detection line TCDL2 in some embodiments includes a first-second portion P12 and a second-second portion P22 in different layers and connected to each other. In one example, the first-second portion P12 is in a same layer as the mesh lines ML of the touch electrode layer TEL, for example, in a same layer as the plurality of first touch electrodes TE1 in FIG. 2A and FIG. 2B. In another example, the second-second portion P22 is in a same layer as a voltage supply line Vss in the peripheral area, for example, in a same layer as the second signal line layer SLL2 in FIG. 2B.

Referring to FIG. 9, the display panel in some embodiments includes a row of first vias v1 extending through at least a touch insulating layer. Multiple mesh lines ML of mesh electrodes of the touch electrode layer TEL are connected to multiple touch signal lines TSL respectively through multiple first vias in the row of first vias v1. Referring to FIG. 9 and FIG. 10B, the first-second portion P12 is connected to the second-second portion P22 through a second-first via v21 in the row of first vias v1.

Figure 11C:
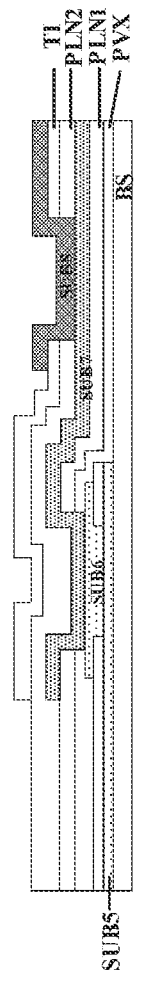
FIG. 11C is a cross-sectional view along a C-C' line in FIG. 10B.

FIG. 11C is a cross-sectional view along a C-C' line in FIG. 10B. Referring to FIG. 11C and FIG. 10B, the second-first via v21 extends through the touch insulating layer TI and the second planarization layer PLN2. The first-second portion P12 is connected to the second-second portion P22 through the second-first via v21.

In some embodiments, the first-second portion P12 is in a same layer as the mesh lines ML of the touch electrode layer TEL. The second-second portion P22, the second-first portion P21, the multiple touch signal lines TSL, and a voltage supply line Vss in the peripheral area are in a second signal line layer (SLL2 in FIG. 2B). The second signal line layer is spaced apart from the first-second portion P12 and the first-first portion P11 by at least the touch insulating layer (TI in FIG. 2B).

Figure 11D:
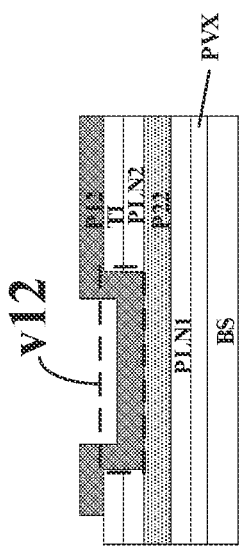
FIG. 11D is a cross-sectional view along a D-D' line in FIG. 10B.

In some embodiments, the second touch crack detection line TCDL2 further includes a third-second portion P32 connected to the second-second portion P22. FIG. 11D is a cross-sectional view along a D-D' line in FIG. 10B. Referring to FIG. 11D, the third-second portion P32 in some embodiments includes a fifth sub-layer SUB5 in a same layer as a gate line of the display panel (Gate1 in FIG. 2A and FIG. 2B); a sixth sub-layer SUB6 on a side of the fifth sub-layer SUB5 away from a base substrate BS, the sixth sub-layer SUB6 in a same layer as a first signal line layer (SLL1 in FIG. 2A and FIG. 2B) of the display panel; a seventh sub-layer SUB7 on a side of the sixth sub-layer SUB6 away from the fifth sub-layer SUB5, the seventh sub-layer SUB7 in a same layer as a second signal line layer (SLL2 in FIG. 2B) of the display panel; and an eighth sub-layer SUB8 on a side of the seventh sub-layer SUB7 away from the sixth sub-layer SUB6, the eighth sub-layer SUB8 in a same layer as the mesh lines of the touch electrode layer. Referring to FIG. 11D, the sixth sub-layer SUB6 connects the fifth sub-layer SUB5 to the seventh sub-layer SUB7; and the seventh sub-layer SUB7 connects the sixth sub-layer SUB6 to the eighth sub-layer SUB8.

FIG. 10C is a schematic diagram illustrating the structure of a portion of a first panel crack detection line in a part of a peripheral area of a display panel in some embodiments according to the present disclosure. Referring to FIG. 10C, FIG. 8, FIG. 9, FIG. 7B, and FIG. 5, the first panel crack detection line PCDL1 in some embodiments includes a first-third portion P13, a second-third portion P23, and a third-third portion P33. The second-third portion P23 is in a layer different from the first-third portion P13 and the third-third portion P33. The second-third portion P23 connects the first-third portion P13 to the third-third portion P33.

In some embodiments, the first-third portion P13 includes at least a sub-layer in a same layer as a gate line (Gate1 in FIG. 2A and FIG. 2B) of the display panel or in a same layer as a second gate metal layer (Gate2 in FIG. 2A and FIG. 2B) of the display panel. Optionally, the first-third portion P13 includes a sub-layer in a same layer as the gate line of the display panel, and a sub-layer in a same layer as the second gate metal layer of the display panel. In some embodiments, the second-third portion P23 is in a same layer as a voltage supply line Vss in the peripheral area. In some embodiments, the third-third portion P33 includes at least a sub-layer in a same layer as the second gate metal layer of the display panel.

FIG. 10D is a schematic diagram illustrating the structure of a portion of a second panel crack detection line in a part of a peripheral area of a display panel in some embodiments according to the present disclosure. Referring to FIG. 10D, FIG. 8, FIG. 9, FIG. 7B, and FIG. 5, the second panel crack detection line PCDL2 in some embodiments includes a first-fourth portion P14, a second-fourth portion P24, and a third-fourth portion P34. The second-fourth portion P24 is in a layer different from the first-fourth portion P14 and the third-fourth portion P34. The second-fourth portion P24 connects the first-fourth portion P14 to the third-fourth portion P34.

In some embodiments, the first-fourth portion P14 includes at least a sub-layer in a same layer as a gate line (Gate1 in FIG. 2A and FIG. 2B) of the display panel or in a same layer as a second gate metal layer (Gate2 in FIG. 2A and FIG. 2B) of the display panel. Optionally, the first-fourth portion P14 includes a sub-layer in a same layer as the gate line of the display panel, and a sub-layer in a same layer as the second gate metal layer of the display panel. In some embodiments, the second-fourth portion P24 is in a same layer as a voltage supply line Vss in the peripheral area. In some embodiments, the third-fourth portion P34 includes at least a sub-layer in a same layer as the gate line of the display panel.

Referring to FIG. 5, FIG. 7A, FIG. 7B, FIG. 10A to FIG. 10D, in some embodiments, the third-fourth portion P34 is connected to a third-second portion P32 of a second touch crack detection line TCDL2 of the first touch crack sub-loop TCSLP1.

Referring to FIG. 5, and FIG. 7A to FIG. 7D, the display panel in some embodiments further includes a connecting line connecting the first conductive loop CLP1 and the second conductive loop CLP2.

FIG. 12 is a zoom-in view of a display panel in some embodiments according to the present disclosure. Referring to FIG. 5 and FIG. 12, in a part of the peripheral area (e.g., the second corner region CR2 as depicted in FIG. 1), the display panel includes a gate-on-array. Multiple signal lines SLG of the gate-on-array are depicted in FIG. 12. Referring to FIG. 5, FIG. 8, and FIG. 12, signal lines of the crack detection circuit do not cross over the gate-on-array in at least the side region (denoted as SR in FIG. 1) of the peripheral area. In the present display panel, in at least the side region of the peripheral area, an orthographic projection of all signal lines in the crack detection circuit on a base substrate is non-overlapping with the orthographic projection of the gate-on-array on the base substrate. In particular, in some embodiments, at least a portion of signal lines in the crack detection circuit includes a metal line in a same layer as mesh lines of the touch electrode layer; and, in at least the side region of the peripheral area, an orthographic projection of a portion of the signal lines in the crack detection circuit having a metal line in a same layer as mesh lines of the touch electrode layer on a base substrate is non-overlapping with an orthographic projection of the gate-on-array on the base substrate.

Referring to FIG. 12, the display panel includes, sequentially arranged along a direction perpendicular to extension directions ED of the second touch crack sub-loop (the third touch crack detection line TCDL3 and the fourth touch crack detection line TCDL4) and the second panel crack sub-loop (the third panel crack detection line PCDL3 and the fourth panel crack detection line PCDL4) in the part of the peripheral area, signal lines SLG of the gate-on-array, a portion of a second panel crack sub-loop (portions of the third panel crack detection line PCDL3 and the fourth panel crack detection line PCDL4), a portion of the voltage supply line Vss, and a portion of the second touch crack sub-loop (portions of the third touch crack detection line TCDL3 and the fourth touch crack detection line TCDL4). Optionally, the display panel includes, sequentially arranged along a direction perpendicular to extension directions ED of the second touch crack sub-loop (the third touch crack detection line TCDL3 and the fourth touch crack detection line TCDL4) and the second panel crack sub-loop (the third panel crack detection line PCDL3 and the fourth panel crack detection line PCDL4) in the part of the peripheral area, signal lines SLG of the gate-on-array, a portion of a second panel crack sub-loop (portions of the third panel crack detection line PCDL3 and the fourth panel crack detection line PCDL4), a portion of the voltage supply line Vss, a portion of the second touch crack sub-loop (portions of the third touch crack detection line TCDL3 and the fourth touch crack detection line TCDL4), and multiple touch signal lines TSL.

Figure 13:
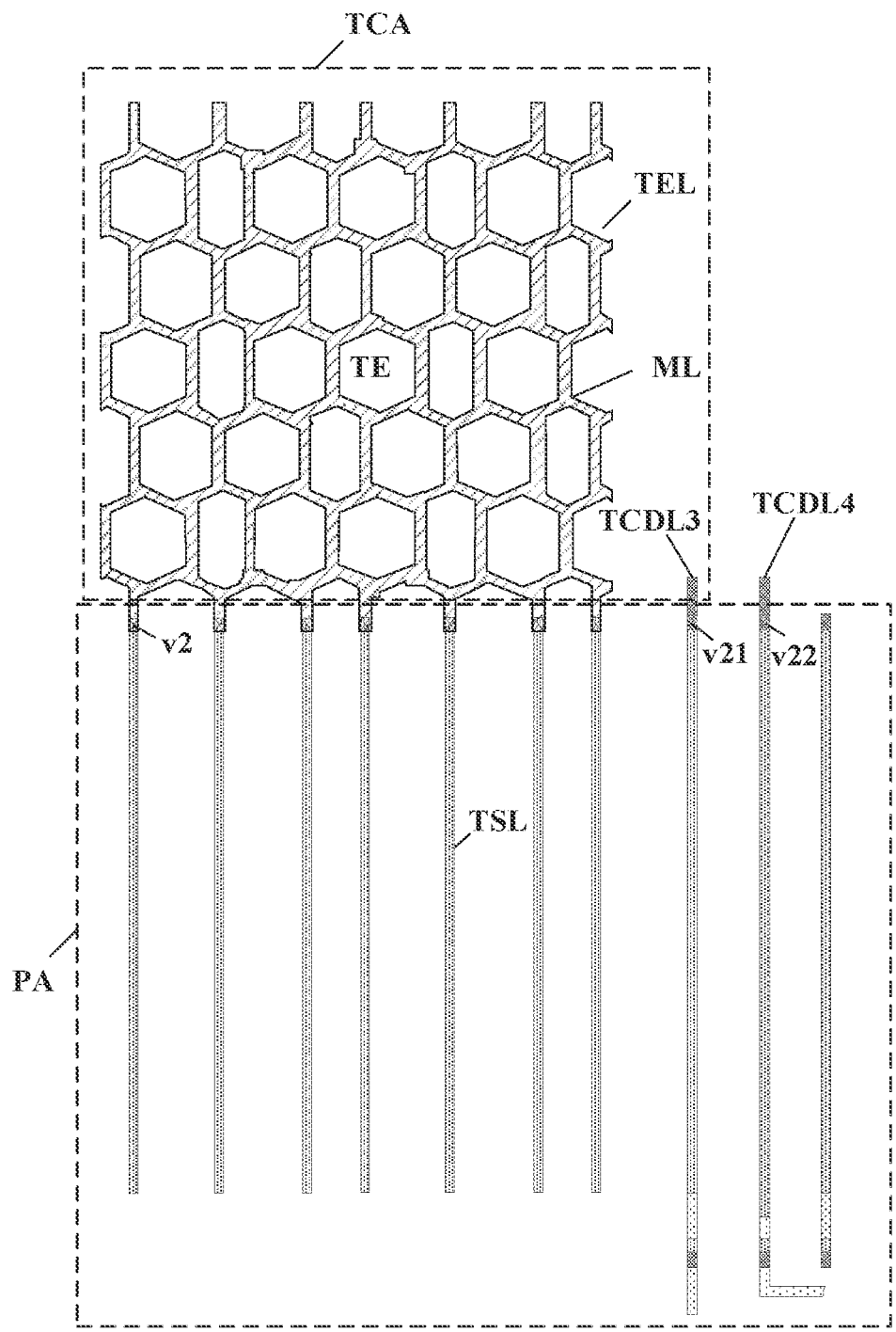
FIG. 13 illustrates connection between mesh lines of a touch electrode layer and multiple touch signal lines in some embodiments according to the present disclosure.

FIG. 13 illustrates connection between mesh lines of a touch electrode layer and multiple touch signal lines in some embodiments according to the present disclosure. Referring to FIG. 13, in a touch control area TCA, the display panel includes a touch electrode layer TEL. The touch electrode layer TEL includes a plurality of touch electrodes TE. The plurality of touch electrodes in some embodiments are mesh electrodes. Mesh lines ML of the touch electrode layer TEL are connected to multiple touch signal lines TSL. The multiple touch signal lines TSL connect the mesh electrodes in the touch electrode layer TEL to an integrated circuit (e.g., a touch control integrated circuit).

In some embodiments, the signal lines SLG of the gate-on-array, the portion of a second panel crack sub-loop, the portion of the voltage supply line Vss, and the portion of the second touch crack sub-loop are in a same layer. In one example, the signal lines SLG of the gate-on-array, the portion of a second panel crack sub-loop, the portion of the voltage supply line Vss, and the portion of the second touch crack sub-loop are in the second signal line layer (SLL2 in FIG. 2B). Optionally, the signal lines SLG of the gate-on-array, the portion of a second panel crack sub-loop, the portion of the voltage supply line Vss, the portion of the second touch crack sub-loop, and the multiple touch signal lines TSL are in a same layer. In another example, the signal lines SLG of the gate-on-array GOA, the portion of a second panel crack sub-loop, the portion of the voltage supply line Vss, the portion of the second touch crack sub-loop, and the multiple touch signal lines TSL are in the second signal line layer (SLL2 in FIG. 2B).

Referring to FIG. 12, in some embodiments, the portion of the voltage supply line Vss extends along a direction substantially parallel to the extension directions ED of the second touch crack sub-loop and the second panel crack sub-loop in the part of the peripheral area.

Figures 14A, 14B:
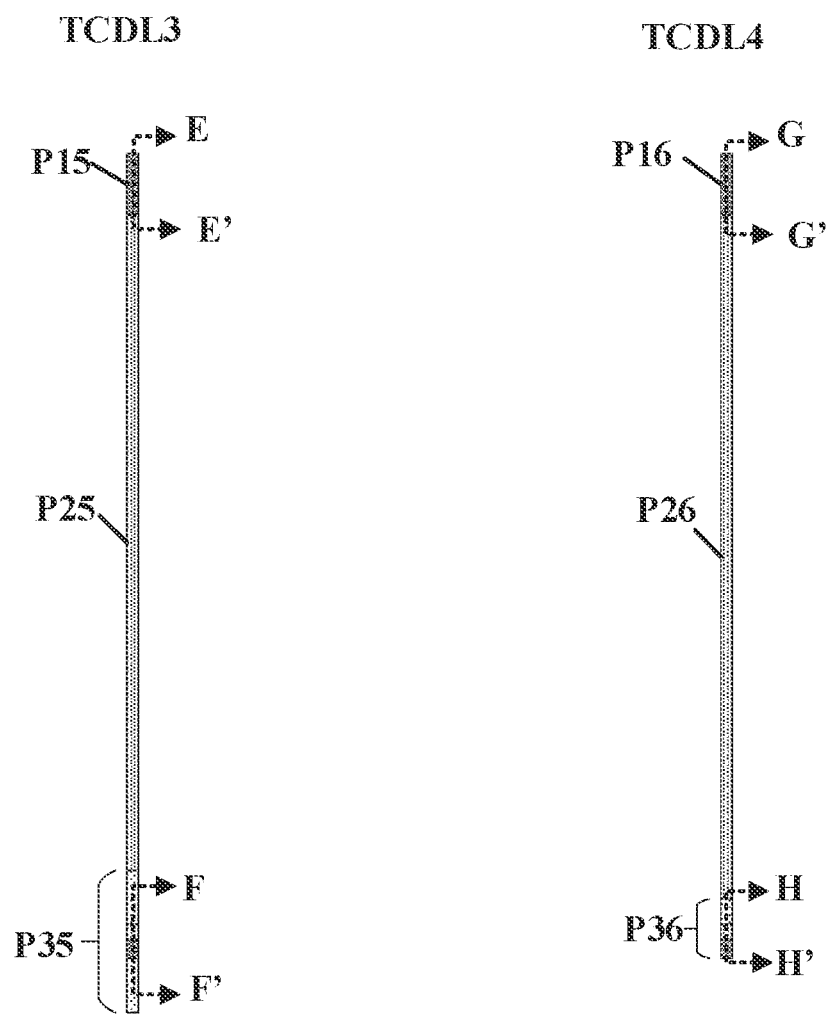
FIG. 14A is a schematic diagram illustrating the structure of a portion of a third touch crack detection line in a part of a peripheral area of a display panel in some embodiments according to the present disclosure.
FIG. 14B is a schematic diagram illustrating the structure of a portion of a fourth touch crack detection line in a part of a peripheral area of a display panel in some embodiments according to the present disclosure.

FIG. 14A is a schematic diagram illustrating the structure of a portion of a third touch crack detection line in a part of a peripheral area of a display panel in some embodiments according to the present disclosure. Referring to FIG. 14A, FIG. 12, FIG. 13, FIG. 7D, and FIG. 5, the third touch crack detection line TCDL3 in some embodiments includes a first-fifth portion P15 and a second-fifth portion P25 in different layers and connected to each other. In one example, the first-fifth portion P15 is in a same layer as the mesh lines ML of the touch electrode layer TEL, for example, in a same layer as the plurality of first touch electrodes TE1 in FIG. 2A and FIG. 2B. In another example, the second-fifth portion P25 is in a same layer as a voltage supply line Vss in the peripheral area, for example, in a same layer as the second signal line layer SLL2 in FIG. 2B.

Referring to FIG. 13, the display panel in some embodiments includes a row of second vias v2 extending through at least a touch insulating layer. Multiple mesh lines ML of mesh electrodes of the touch electrode layer TEL are connected to multiple touch signal lines TSL respectively through multiple first vias in the row of second vias v2. Referring to FIG. 13 and FIG. 14A, the first-fifth portion P15 is connected to the second-fifth portion P25 through a first-second via v21 in the row of second vias v2.

FIG. 15A is a cross-sectional view along a E-E' line in FIG. 14A. Referring to FIG. 15A and FIG. 14A, the first-second via v21 extends through the touch insulating layer TI and the second planarization layer PLN2. The first-fifth portion P15 is connected to the second-fifth portion P25 through the first-second via v21.

In some embodiments, the first-fifth portion P15 is in a same layer as the mesh lines ML of the touch electrode layer TEL. The second-fifth portion P25, the multiple touch signal lines TSL, and a voltage supply line Vss in the peripheral area are in a second signal line layer (SLL2 in FIG. 2B). The second signal line layer is spaced apart from the first-fifth portion P15 by at least the touch insulating layer (TI in FIG. 2B).

In some embodiments, the third touch crack detection line TCDL3 further includes a third-fifth portion P35 connected to the second-first portion P21. FIG. 15B is a cross-sectional view along an F-F' line in FIG. 14A. Referring to FIG. 15B, the third-fifth portion P35 in some embodiments includes a ninth sub-layer SUB9 in a same layer as a second gate metal layer (Gate2 in FIG. 2A and FIG. 2B) of the display panel; a tenth sub-layer SUB10 on a side of the ninth sub-layer SUB9 away from a base substrate BS, the tenth sub-layer SUB10 in a same layer as a first signal line layer (SLL1 in FIG. 2A and FIG. 2B) of the display panel; an eleventh sub-layer SUB11 on aside of the tenth sub-layer SUB10 away from the ninth sub-layer SUB9, the eleventh sub-layer SUB11 in a same layer as a second signal line layer (SLL2 in FIG. 2B) of the display panel; and a twelfth sub-layer SUB12 on a side of the eleventh sub-layer SUB11 away from the tenth sub-layer SUB10, the twelfth sub-layer SUB12 in a same layer as the mesh lines of the touch electrode layer. Referring to FIG. 15B, the tenth sub-layer SUB10 connects the ninth sub-layer SUB9 to the eleventh sub-layer SUB11; and the eleventh sub-layer SUB11 connects the tenth sub-layer SUB10 to the twelfth sub-layer SUB12.

FIG. 14B is a schematic diagram illustrating the structure of a portion of a fourth touch crack detection line in a part of a peripheral area of a display panel in some embodiments according to the present disclosure. Referring to FIG. 14B, FIG. 12, FIG. 13, FIG. 7D, and FIG. 5, the fourth touch crack detection line TCDL4 in some embodiments includes a first-sixth portion P16 and a second-sixth portion P26 in different layers and connected to each other. In one example, the first-sixth portion P16 is in a same layer as the mesh lines ML of the touch electrode layer TEL, for example, in a same layer as the plurality of first touch electrodes TE1 in FIG. 2A and FIG. 2B. In another example, the second-sixth portion P26 is in a same layer as a voltage supply line Vss in the peripheral area, for example, in a same layer as the second signal line layer SLL2 in FIG. 2B.

Referring to FIG. 13, the display panel in some embodiments includes a row of second vias v2 extending through at least a touch insulating layer. Multiple mesh lines ML of mesh electrodes of the touch electrode layer TEL are connected to multiple touch signal lines TSL respectively through multiple second vias in the row of second vias v2. Referring to FIG. 13 and FIG. 14B, the first-sixth portion P16 is connected to the second-sixth portion P26 through a second-second via v22 in the row of second vias v2.

FIG. 15C is a cross-sectional view along a G-G' line in FIG. 14B. Referring to FIG. 15C and FIG. 14B, the second-second via v22 extends through the touch insulating layer TI and the second planarization layer PLN2. The first-sixth portion P16 is connected to the second-sixth portion P26 through the second-second via v22.

In some embodiments, the first-sixth portion P16 is in a same layer as the mesh lines ML of the touch electrode layer TEL. The second-sixth portion P26, the second-fifth portion P25, the multiple touch signal lines TSL, and a voltage supply line Vss in the peripheral area are in a second signal line layer (SLL2 in FIG. 2B). The second signal line layer is spaced apart from the first-sixth portion P16 and the first-fifth portion P15 by at least the touch insulating layer (TI in FIG. 2B).

In some embodiments, the fourth touch crack detection line TCDL4 further includes a third-sixth portion P36 connected to the second-sixth portion P26. FIG. 15D is a cross-sectional view along a H-H' line in FIG. 14B. Referring to FIG. 15D, the third-sixth portion P36 in some embodiments includes a thirteenth sub-layer SUB13 in a same layer as a gate line of the display panel (Gate1 in FIG. 2A and FIG. 2B); a fourteenth sub-layer SUB14 on a side of the thirteenth sub-layer SUB13 away from a base substrate BS, the fourteenth sub-layer SUB14 in a same layer as a first signal line layer (SLL1 in FIG. 2A and FIG. 2B) of the display panel; a fifteenth sub-layer SUB15 on a side of the fourteenth sub-layer SUB14 away from the thirteenth sub-layer SUB13, the fifteenth sub-layer SUB15 in a same layer as a second signal line layer (SLL2 in FIG. 2B) of the display panel; and a sixteenth sub-layer SUB16 on a side of the fifteenth sub-layer SUB15 away from the fourteenth sub-layer SUB14, the sixteenth sub-layer SUB16 in a same layer as the mesh lines of the touch electrode layer. Referring to FIG. 15D, the fourteenth sub-layer SUB14 connects the thirteenth sub-layer SUB13 to the fifteenth sub-layer SUB15; and the fifteenth sub-layer SUB15 connects the fourteenth sub-layer SUB14 to the sixteenth sub-layer SUB16.

Figures 14C, 14D:
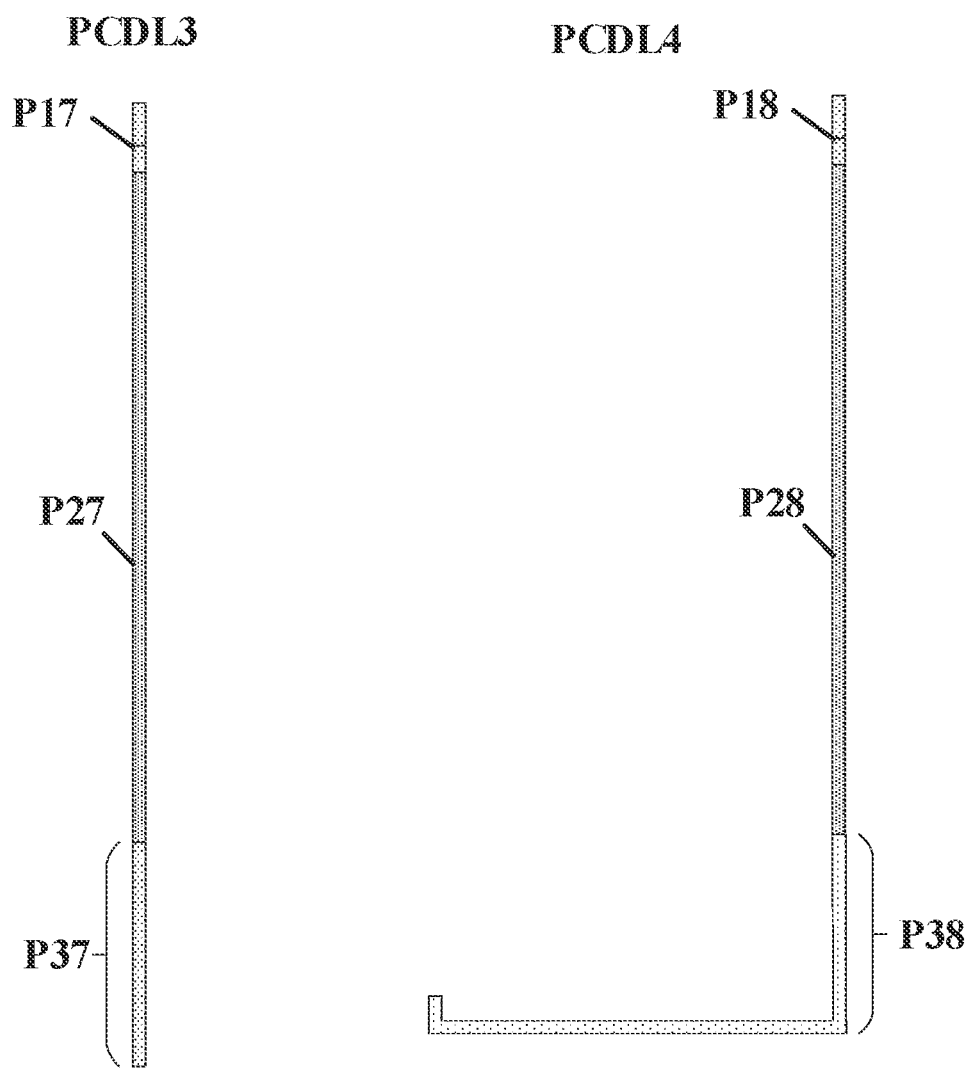
FIG. 14C is a schematic diagram illustrating the structure of a portion of a third panel crack detection line in a part of a peripheral area of a display panel in some embodiments according to the present disclosure.
FIG. 14D is a schematic diagram illustrating the structure of a portion of a fourth panel crack detection line in a part of a peripheral area of a display panel in some embodiments according to the present disclosure.

FIG. 14C is a schematic diagram illustrating the structure of a portion of a third panel crack detection line in a part of a peripheral area of a display panel in some embodiments according to the present disclosure. Referring to FIG. 14C, FIG. 12, FIG. 13, FIG. 7C, and FIG. 5, the third panel crack detection line PCDL3 in some embodiments includes a first-seventh portion P17, a second-seventh portion P27, and a third-seventh portion P37. The second-seventh portion P27 is in a layer different from the first-seventh portion P17 and the third-seventh portion P37. The second-seventh portion P27 connects the first-seventh portion P17 to the third-seventh portion P37.

In some embodiments, the first-seventh portion P17 includes at least a sub-layer in a same layer as a gate line (Gate1 in FIG. 2A and FIG. 2B) of the display panel or in a same layer as a second gate metal layer (Gate2 in FIG. 2A and FIG. 2B) of the display panel. Optionally, the first-seventh portion P17 includes a sub-layer in a same layer as the gate line of the display panel, and a sub-layer in a same layer as the second gate metal layer of the display panel. In some embodiments, the second-seventh portion P27 is in a same layer as a voltage supply line Vss in the peripheral area. In some embodiments, the third-seventh portion P37 includes at least a sub-layer in a same layer as the second gate metal layer of the display panel.

FIG. 14D is a schematic diagram illustrating the structure of a portion of a fourth panel crack detection line in a part of a peripheral area of a display panel in some embodiments according to the present disclosure. Referring to FIG. 14D, FIG. 12, FIG. 13, FIG. 7C, and FIG. 5, the fourth panel crack detection line PCDL4 in some embodiments includes a first-eighth portion P18, a second-eighth portion P28, and a third-eighth portion P38. The second-eighth portion P28 is in a layer different from the first-eighth portion P18 and the third-eighth portion P38. The second-eighth portion P28 connects the first-eighth portion P18 to the third-eighth portion P38.

In some embodiments, the first-eighth portion P18 includes at least a sub-layer in a same layer as a gate line (Gate1 in FIG. 2A and FIG. 2B) of the display panel or in a same layer as a second gate metal layer (Gate2 in FIG. 2A and FIG. 2B) of the display panel. Optionally, the first-eighth portion P18 includes a sub-layer in a same layer as the gate line of the display panel, and a sub-layer in a same layer as the second gate metal layer of the display panel. In some embodiments, the second-eighth portion P28 is in a same layer as a voltage supply line Vss in the peripheral area. In some embodiments, the third-eighth portion P38 includes at least a sub-layer in a same layer as the gate line of the display panel.

Referring to FIG. 5, FIG. 7A, FIG. 7C, FIG. 14A to FIG. 14D, in some embodiments, the third-eighth portion P38 is connected to a third-sixth portion P36 of a fourth touch crack detection line TCDL4 of the second touch crack sub-loop TCSLP2.

In another aspect, the present disclosure provides a display apparatus. In some embodiments, the display apparatus includes a display panel described herein, and a printed circuit board connected to an integrated circuit in the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel, comprising:
   a touch electrode layer at least partially in a display area of the display panel;
   a gate-on-array in a peripheral area of the display panel; and
   a crack detection circuit;
   wherein at least a portion of signal lines in the crack detection circuit comprises a metal line in a same layer as mesh lines of the touch electrode layer;
   the crack detection circuit comprises an integrated circuit and a first conductive loop electrically connected to the integrated circuit; and
   the first conductive loop comprises a first touch crack sub-loop and a first panel crack sub-loop connected to each other, at least a portion of the first touch crack sub-loop being in a same layer as the mesh lines of the touch electrode layer; at least a portion of the first panel crack sub-loop being in a same layer as a gate line of the display panel.

2. The display panel of claim 1, further comprising a voltage supply line in a part of the peripheral area;
   wherein the display panel comprises, sequentially arranged along a direction perpendicular to extension directions of the first touch crack sub-loop and the first panel crack sub-loop in the part of the peripheral area, signal lines of the gate-on-array, a portion of the first panel crack sub-loop, a portion of the voltage supply line, and a portion of the first touch crack sub-loop.

3. The display panel of claim 2, wherein the signal lines of the gate-on-array, the portion of the first panel crack sub-loop, the portion of the voltage supply line, and the portion of the first touch crack sub-loop are in a same layer.

4. The display panel of claim 2, wherein the portion of the voltage supply line extends along a direction substantially parallel to the extension directions of the first touch crack sub-loop and the first panel crack sub-loop in the part of the peripheral area.

5. The display panel of claim 1, wherein the first touch crack sub-loop comprises a first touch crack detection line and a second touch crack detection line on a same side relative to the display area, the first touch crack detection line spacing apart the second touch crack detection line from the display area; and
   the first touch crack detection line comprises a first-first portion and a second-first portion in different layers and connected to each other.

6. The display panel of claim 5, wherein the second-first portion is in a same layer as a voltage supply line in the peripheral area; and
   the first-first portion is in a same layer as the mesh lines of the touch electrode layer.

7. The display panel of claim 5, comprising a row of first vias respectively extending through at least a touch insulating layer;
   wherein the first-first portion is connected to the second-first portion through a first-first via in the row of first vias; and
   multiple mesh lines of mesh electrodes of the touch electrode layer are connected to multiple touch signal lines respectively through multiple first vias in the row of first vias.

8. The display panel of claim 7, wherein the first-first portion is in a same layer as the mesh lines of the mesh electrodes of the touch electrode layer; and
   the second-first portion, the multiple touch signal lines, and a voltage supply line in the peripheral area are in a second signal line layer spaced apart from the first-first portion by at least the touch insulating layer.

9. The display panel of claim 5, wherein the first touch crack detection line further comprises a third-first portion connected to the second-first portion;
   the third-first portion comprises:
   a first sub-layer in a same layer as a second gate metal layer of the display panel;
   a second sub-layer on a side of the first sub-layer away from a base substrate, the second sub-layer in a same layer as a first signal line layer of the display panel;
   a third sub-layer on a side of the second sub-layer away from the first sub-layer, the third sub-layer in a same layer as a second signal line layer of the display panel; and
   a fourth sub-layer on a side of the third sub-layer away from the second sub-layer, the fourth sub-layer in a same layer as the mesh lines of the touch electrode layer.

10. The display panel of claim 5, wherein the second touch crack detection line comprises a first-second portion and a second-second portion in different layers and connected to each other;
    wherein the display panel comprises a row of first vias respectively extending through at least a touch insulating layer;
    the first-second portion is connected to the second-second portion through a second-first via in the row of first vias;
    mesh lines of mesh electrodes of the touch electrode layer are connected to multiple touch signal lines respectively through multiple first vias in the row of first vias;
    the first-second portion is in a same layer as the mesh lines of the mesh electrodes of the touch electrode layer; and the second-second portion and the multiple touch signal lines are in a second signal line layer spaced apart from the first-first portion by at least the touch insulating layer.

11. The display panel of claim 10, wherein the second touch crack detection line further comprises a third-second portion connected to the second-second portion;

the third-second portion comprises:
a fifth sub-layer in a same layer as a gate line of the display panel;
a sixth sub-layer on a side of the fifth sub-layer away from a base substrate, the sixth sub-layer in a same layer as a first signal line layer of the display panel;
a seventh sub-layer on a side of the sixth sub-layer away from the fifth sub-layer, the seventh sub-layer in a same layer as a second signal line layer of the display panel; and
an eighth sub-layer on a side of the seventh sub-layer away from the sixth sub-layer, the eighth sub-layer in a same layer as the mesh lines of the touch electrode layer.

12. The display panel of claim 1, wherein the first panel crack sub-loop comprises a first panel crack detection line and a second panel crack detection line on a same side relative to the display area, the second panel crack detection line spacing apart the first panel crack detection line from the display area; and the first panel crack detection line comprises a first-third portion, a second-third portion, and a third-third portion, the second-third portion being in a layer different from the first-third portion and the third-third portion, the second-third portion connecting the first-third portion to the third-third portion.

13. The display panel of claim 12, wherein the first-third portion comprises at least a sub-layer in a same layer as a gate line of the display panel or in a same layer as a second gate metal layer;

the second-third portion is in a same layer as a voltage supply line in the peripheral area; and the third-third portion comprises at least a sub-layer in a same layer as the second gate metal layer.

14. The display panel of claim 12, wherein the second panel crack detection line comprises a first-fourth portion, a second-fourth portion, and a third-fourth portion, the second-fourth portion being in a layer different from the first-fourth portion and the third-fourth portion, the second-fourth portion connecting the first-fourth portion to the third-fourth portion.

15. The display panel of claim 14, wherein the first-fourth portion comprises at least a sub-layer in a same layer as a gate line of the display panel or in a same layer as a second gate metal layer;

the second-fourth portion is in a same layer as a voltage supply line in the peripheral area; and the third-fourth portion comprises at least a sub-layer in a same layer as the gate line of the display panel.

16. The display panel of claim 14, wherein the third-fourth portion is connected to a third-second portion of a second touch crack detection line of the first touch crack sub-loop.

17. The display panel of claim 1, further comprising:
a second conductive loop electrically connected to the integrated circuit; and
a connecting line connecting the first conductive loop and the second conductive loop;
wherein the second conductive loop comprises a second touch crack sub-loop and a second panel crack sub-loop connected to each other, at least a portion of the second touch crack sub-loop being in a same layer as the mesh lines of the touch electrode layer; at least a portion of the second panel crack sub-loop being in a same layer as a gate line of the display panel.

18. A display apparatus, comprising the display panel of claim 1, and a printed circuit board connected to an integrated circuit in the display panel.

* * * * *